United States Patent
Ridley, Jr. et al.

(10) Patent No.: US 12,291,683 B1
(45) Date of Patent: May 6, 2025

(54) PROCESSES AND SYSTEMS FOR PRODUCTION OF SUSTAINABLE AVIATION FUEL FROM SYNGAS VIA MIXED ALCOHOLS

(71) Applicant: Standard Alcohol Company of America, Inc., Denver, CO (US)

(72) Inventors: Richard Denham Ridley, Jr., Berthoud, CO (US); Geradette Giardino, Arvada, CO (US); Michael Emory Pardun, Denver, CO (US); Robert Mulverhill, Denver, CO (US); Frans L. Plantenga, Hoevelaken (NL)

(73) Assignee: Standard Alcohol Company of America, Inc., Denver, CO (US)

( * ) Notice: Subject to any disclaimer, the term of this patent is extended or adjusted under 35 U.S.C. 154(b) by 0 days.

(21) Appl. No.: 18/910,667

(22) Filed: Oct. 9, 2024

Related U.S. Application Data

(60) Provisional application No. 63/670,532, filed on Jul. 12, 2024, provisional application No. 63/543,648, filed on Oct. 11, 2023.

(51) Int. Cl.
*C10L 1/08* (2006.01)

(52) U.S. Cl.
CPC ......... *C10L 1/08* (2013.01); *C10L 2200/0469* (2013.01); *C10L 2270/04* (2013.01)

(58) Field of Classification Search
CPC . C10G 2/32; C07C 29/154; C10L 1/08; C10L 2200/0469; C10L 2270/04
See application file for complete search history.

(56) References Cited

U.S. PATENT DOCUMENTS

| | | | |
|---|---|---|---|
| 2014/0114101 A1* | 4/2014 | Greene | C10G 3/49 585/329 |
| 2015/0247100 A1* | 9/2015 | Bradin | C10G 3/49 585/254 |

* cited by examiner

Primary Examiner — Jafar F Parsa
(74) Attorney, Agent, or Firm — O'Connor & Company; Ryan P. O'Connor

(57) ABSTRACT

Technology to convert syngas into aviation fuel is described. Some variations provide a process comprising: providing a starting syngas stream comprising $H_2$ and CO; purifying the syngas feed stream, if necessary; feeding the clean syngas stream to an alcohol-synthesis reactor, to catalytically convert syngas to a $C_1$-$C_{10}$ mixed-alcohol stream; feeding the $C_1$-$C_{10}$ mixed-alcohol stream to a dehydration reactor, to catalytically convert $C_1$-$C_{10}$ mixed alcohols to $C_2$-$C_{10}$ mixed olefins; feeding the mixed olefins to an oligomerization reactor, to catalytically convert the $C_2$-$C_{10}$ mixed olefins to $C_5$-$C_{16}$ mixed hydrocarbons; feeding the $C_5$-$C_{16}$ mixed hydrocarbons and hydrogen to a hydrogenation reactor, to catalytically hydrogenate C=C double bonds within the $C_5$-$C_{16}$ mixed hydrocarbons, thereby generating stabilized $C_5$-$C_{16}$ mixed hydrocarbons; and recovering the stabilized $C_5$-$C_{16}$ mixed hydrocarbons as aviation fuel. In preferred embodiments, the aviation fuel is sustainable aviation fuel (SAF) under ASTM D7566-24a.

30 Claims, 5 Drawing Sheets

PROCESSES AND SYSTEMS FOR PRODUCTION OF SUSTAINABLE AVIATION FUEL FROM SYNGAS VIA MIXED ALCOHOLS

PRIORITY DATA

This patent application claims priority to U.S. Provisional Patent App. No. 63/670,532, filed on Jul. 12, 2024, which is hereby incorporated by reference herein. This patent application also claims priority to U.S. Provisional Patent App. No. 63/543,648, filed on Oct. 11, 2023, which is hereby incorporated by reference herein.

FIELD OF THE INVENTION

The present invention generally relates to processes and systems for producing sustainable aviation fuel from syngas obtained from a wide variety of sources.

BACKGROUND OF THE INVENTION

Aviation fuel is conventionally a petroleum-based fuel used to power aircraft by combustion. Ever since the first commercial flight in 1914, aviation fuel has been an important global commodity. A commercially important type of aviation fuel is Jet A-1, a kerosene-type fuel compatible with most civil and military jet aircraft, helicopter turbine engines, turboprops, and compression-ignition piston engines. Jet A-1 aviation fuel must meet strict international standards, such as ASTM D1655 and DEF STAN 91-091.

There is extraordinary interest in sustainable aviation fuel ("SAF"). SAF has essentially the same composition as conventional aviation fuel, but it is produced in a more sustainable manner due to use of renewable feedstocks, waste feedstocks, and/or processes having lower carbon intensities. U.S. federal guidance requires that SAF have at least 50% lifecycle greenhouse gas (GHG) reduction relative to petroleum-derived aviation fuel, in order to qualify for SAF production tax credits. Importantly, because the SAF composition is the same as normal aviation fuel, SAF requires no change in aircraft design or fueling infrastructure.

The U.S. Sustainable Aviation Fuel (SAF) Grand Challenge, announced by the Biden Administration in Fall 2021, is an ambitious proposal aimed at increasing domestic production of SAF. The SAF Grand Challenge set targets for producing 3 billion gallons of SAF in the United States by 2030 and 35 billion gallons by 2050, enough to meet long-term aviation fuel demand. Following this announcement, the U.S. government enacted tax credits for SAF production of up to $1.75 per gallon through 2027.

Aviation fuel demand is expected to increase over the coming decades. The U.S. Federal Aviation Administration (FAA) estimates that GHG emissions from aviation could double from 2019 levels by 2050, absent technology and policy interventions. The FAA has emphasized the role of SAF in mitigating the projected rise in GHG emissions over the long term.

SAF has also attracted significant interest globally. For example, the International Civil Aviation Organization (ICAO) has adopted a long-term strategy for carbon-neutral growth from 2020 onward. The ICAO strategy includes measures such as operational and efficiency improvements, increased SAF blending, and the use of carbon offsets under the Carbon Offsetting and Reduction Scheme for International Aviation (CORSIA) program. Additional SAF deployment is expected to be motivated by ICAO's adoption of a 2050 net-zero $CO_2$ emissions goal in October 2022.

This Background hereby incorporates by reference O'Malley et al., "MEETING THE SAF GRAND CHALLENGE: CURRENT AND FUTURE MEASURES TO INCREASE U.S. SUSTAINABLE AVIATION FUEL PRODUCTION CAPACITY", International Council on Clean Transportation, Washington, DC, USA, November 2023.

The global demand for SAF is well-established, but there are serious supply-side challenges. SAF can be produced from hydrotreated vegetable and waste oils today, but it is well-known that hydroprocessed esters and fatty acids (HEFA) fuels are highly resource constrained. The total worldwide availability of HEFA is not even close to meeting forecast demand for SAF.

S&P Global has estimated the 2050 SAF demand globally to be 32 billion gallons SAF per year (https://www.spglobal.com, accessed on Jul. 11, 2024). Assuming a typical nameplate capacity of 50 million gallons SAF per year, that demand equates to 640 commercial-scale plants! Clearly, there is a tremendous worldwide need for economic SAF technology and infrastructure.

Synthesis gas (syngas), a mixture of hydrogen and carbon monoxide, represents a flexible platform for the production of various fuels and chemicals. There is a commercial desire for production of SAF from syngas, in which the syngas is generated from a wide variety of industrial sources.

SUMMARY OF THE INVENTION

The present invention addresses the aforementioned needs in the art, by providing various processes and systems to convert syngas into aviation fuel.

Some variations provide a process for producing aviation fuel from syngas, the process comprising:
  (a) providing a starting syngas stream comprising $H_2$ and CO;
  (b) purifying the syngas feed stream to generate a clean syngas stream;
  (c) optionally, adjusting the $H_2$/CO ratio of the starting syngas stream or the clean syngas stream;
  (d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_1$-$C_{10}$ mixed-alcohol stream and a reactor off-gas;
  (e) optionally, purifying the $C_1$-$C_{10}$ mixed-alcohol stream to generate a clean $C_1$-$C_{10}$ mixed-alcohol stream;
  (f) feeding the $C_1$-$C_{10}$ mixed-alcohol stream or, if step (e) is conducted, the clean $C_1$-$C_{10}$ mixed-alcohol stream to a dehydration reactor operated at effective alcohol-dehydration conditions and in the presence of a dehydration catalyst, to catalytically convert at least a portion of the $C_1$-$C_{10}$ mixed alcohols to $C_2$-$C_{10}$ mixed olefins;
  (g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;
  (h) optionally, separating and removing light or heavy hydrocarbons that are not within the $C_5$-$C_{16}$ range, from the hydrocarbon stream;
  (i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

The starting syngas stream may be obtained from a source selected from the group consisting of methane steam reforming, methane autothermal reforming, methane partial oxidation, biomass gasification, waste polymer gasification, municipal solid waste gasification or plasma treatment, coal gasification, coke gasification, $CO_2$ conversion to syngas, and combinations thereof, for example. Other syngas sources may be used.

In some embodiments, the starting syngas stream is obtained from methane, wherein the methane is contained in biogas from anaerobic digestion.

In some embodiments, the starting syngas stream is obtained from methane, wherein the methane is contained in landfill biogas.

In some embodiments, the starting syngas stream is already sufficiently pure such that step (b) may be omitted. In these embodiments, the clean syngas stream may be considered equivalent to the starting syngas stream.

In some embodiments utilizing $CO_2$ as a syngas source, the $CO_2$ conversion to syngas utilizes electrochemical conversion of $CO_2$. Alternatively, or additionally, the $CO_2$ conversion to syngas may utilize water-gas shift chemistry. Alternatively, or additionally, the $CO_2$ conversion to syngas may utilize dry reforming of $CO_2$ with methane.

In some embodiments, the clean $C_1$-$C_{10}$ mixed-alcohol stream is a $C_2$-$C_5$ mixed-alcohol stream.

In some embodiments, the clean $C_1$-$C_{10}$ mixed-alcohol stream has a number-average carbon number selected from 2 to 5. In some embodiments, the clean $C_1$-$C_{10}$ mixed-alcohol stream has a number-average carbon number selected from 3 to 6. In certain embodiments, the clean $C_1$-$C_{10}$ mixed-alcohol stream has a number-average carbon number selected from 3 to 5. In certain embodiments, the clean $C_1$-$C_{10}$ mixed-alcohol stream has a number-average carbon number selected from 2 to 4. In certain embodiments, the clean $C_1$-$C_{10}$ mixed-alcohol stream has a number-average carbon number selected from 3 to 4. The number-average carbon number may be controlled and/or optimized by changing reaction conditions during mixed-alcohol synthesis, by using recycle of alcohols back to the reactor, and/or by using catalysts that favor higher alcohols, for example.

In preferred embodiments, the clean $C_1$-$C_{10}$ mixed-alcohol stream has a number-average carbon number selected based on the influence of the number-average carbon number on downstream process performance in step (f), step (g), and/or step (i). In some embodiments, the clean $C_1$-$C_{10}$ mixed-alcohol stream has a number-average carbon number selected based on the influence of the number-average carbon number on final product properties, including (but not limited to) the degree of hydrocarbon branching.

In some embodiments, the $C_5$-$C_{16}$ mixed hydrocarbons are $C_8$-$C_{16}$ mixed hydrocarbons. In other embodiments, the $C_5$-$C_{16}$ mixed hydrocarbons are $C_5$-$C_{15}$ mixed hydrocarbons.

The process may further comprise a step of feeding a portion of the starting syngas stream and/or the clean syngas stream, as an aromatics-allocated syngas stream, to a syngas-to-aromatics reactor operated at effective aromatization conditions in the presence of an aromatization catalyst, to catalytically convert at least a portion of the aromatics-allocated syngas stream to a $C_6$-$C_{16}$ mixed aromatics stream. The $C_6$-$C_{16}$ mixed aromatics stream may be combined with the stabilized $C_5$-$C_{16}$ mixed hydrocarbons to generate an aromatics-containing aviation fuel. In some embodiments, the aromatics-containing aviation fuel contains from about 8 vol % to about 20 vol % total aromatics content.

The process may further comprise a step of feeding a portion of the $C_1$-$C_{10}$ mixed-alcohol stream and/or the clean $C_1$-$C_{10}$ mixed-alcohol stream, as an aromatics-allocated alcohol stream, to an alcohol-to-aromatics reactor operated at effective aromatization conditions in the presence of an aromatization catalyst, to catalytically convert at least a portion of the aromatics-allocated alcohol stream to a $C_6$-$C_{16}$ mixed aromatics stream. The $C_6$-$C_{16}$ mixed aromatics stream may be combined with the stabilized $C_5$-$C_{16}$ mixed hydrocarbons to generate an aromatics-containing aviation fuel. In some embodiments, the aromatics-containing aviation fuel contains from about 8 vol % to about 20 vol % total aromatics content.

In some embodiments, the process further comprises isomerizing a portion of the $C_2$-$C_{10}$ mixed olefins to create branched $C_2$-$C_{10}$ olefins.

In some embodiments, the process further comprises isomerizing a portion of the $C_5$-$C_{16}$ mixed hydrocarbons, before step (i) or during step (i), to create branched $C_5$-$C_{16}$ hydrocarbons. A hydroisomerization catalyst may be utilized to assist isomerization during olefin hydrogenation.

In some embodiments, the starting syngas stream has a starting $H_2$/CO ratio selected from about 0.7 to about 1.6. In certain embodiments, the starting $H_2$/CO ratio is selected from about 0.8 to about 1.2. In various embodiments, the starting $H_2$/CO ratio is selected as about, at least about, or at most about 0.7, 0.8, 0.9, 1.0, 1.1, 1.2, 1.3, 1.4, 1.5, or 1.6, including all intervening ranges.

In some embodiments, the clean syngas stream has a reactor-feed $H_2$/CO ratio selected from about 0.7 to about 1.6. In certain embodiments, the reactor-feed $H_2$/CO ratio is selected from about 0.8 to about 1.2. In various embodiments, the reactor-feed $H_2$/CO ratio is selected as about, at least about, or at most about 0.7, 0.8, 0.9, 1.0, 1.1, 1.2, 1.3, 1.4, 1.5, or 1.6, including all intervening ranges.

When the starting syngas stream contains excess $H_2$ relative to a selected reactor-feed $H_2$/CO ratio, the excess $H_2$ is optionally separated from the starting syngas stream or from the clean syngas stream. The excess $H_2$ may be utilized as at least some of the hydrogen in step (i) as feed to the hydrogenation reactor, if desired.

In some embodiments, the process further comprises removal of at least some methanol in an output stream from the alcohol-synthesis reactor, as removed methanol. In certain embodiments, the removed methanol is substantially all methanol in the output stream from the alcohol-synthesis reactor. The process may further comprise recycle of at least some of the removed methanol, or possibly recycle of substantially all of the removed methanol. Alternatively, or additionally, methanol may be sold or used for other purposes other than conversion to aviation fuel.

In some embodiments, the process further comprises separating a methanol-rich stream from the $C_1$-$C_{10}$ mixed-alcohol stream, prior to step (e). In other embodiments, the process further comprises separating a methanol-rich stream from the $C_1$-$C_{10}$ mixed-alcohol stream, during the purifying in step (e). In still other embodiments, the process further comprises separating a methanol-rich stream from the $C_1$-$C_{10}$ mixed-alcohol stream, after step (e). For example, the process may comprise separating a methanol-rich stream from the clean $C_1$-$C_{10}$ mixed-alcohol stream, prior to step (f).

In certain embodiments, the process further comprises separating a methanol-rich stream from the $C_1$-$C_{10}$ mixed-alcohol stream. The methanol-rich stream may be fed to a methanol-to-olefins reactor that is distinct from the dehydration reactor, generating methanol-derived olefins (typically a mixture of ethylene and propylene). The methanol-derived olefins may be converted to methanol-derived aviation fuel, which is optionally combined with the aviation fuel from step (j) to increase the overall production of aviation fuel.

In certain embodiments, substantially no methanol feeds into the dehydration reactor in step (f).

In some processes, in step (d), the alcohol-synthesis catalyst is a metal sulfide catalyst, such as a sulfided cobalt-molybdenum catalyst. The sulfided cobalt-molybdenum catalyst may be potassium-promoted. Alternatively, or additionally, the sulfided cobalt-molybdenum catalyst may contain vanadium.

Step (e), when performed, may include one or more of sulfur removal, water removal, and distillation.

In some embodiments, the reactor off-gas is recycled to step (b). Optionally, the reactor off-gas is first treated to remove contaminants, to remove $H_2O$, to remove $CO_2$, or to adjust $H_2$/CO ratio, for example, prior to recycling to step (b).

In some embodiments, step (h) is conducted to remove light or heavy hydrocarbons that are not within the $C_5$-$C_{16}$ range, from the hydrocarbon stream. Step (h) may utilize evaporation or distillation, for example.

Heat integration may be applied to the process, such as by taking heat from an exothermic step and using it in an endothermic step. The process may use heat evolved from at least one of step (d), step (g), or step (i), in at least one of step (f) or step (h).

In preferred embodiments, the aviation fuel qualifies as sustainable aviation fuel under ASTM D7566-24a.

Other variations provide a process for producing aviation fuel from syngas, the process comprising:
(a) providing a starting syngas stream comprising $H_2$ and CO;
(b) purifying the syngas feed stream to generate a clean syngas stream;
(c) optionally, adjusting the $H_2$/CO ratio of the starting syngas stream or the clean syngas stream;
(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_2$-$C_{10}$ mixed-alcohol stream and a reactor off-gas;
(e) optionally, purifying the $C_2$-$C_{10}$ mixed-alcohol stream to generate a clean $C_2$-$C_{10}$ mixed-alcohol stream;
(f) feeding the $C_2$-$C_{10}$ mixed-alcohol stream or, if step (e) is conducted, the clean $C_2$-$C_{10}$ mixed-alcohol stream to a dehydration reactor operated at effective alcohol-dehydration conditions and in the presence of a dehydration catalyst, to catalytically convert at least a portion of the $C_2$-$C_{10}$ mixed alcohols to $C_2$-$C_{10}$ mixed olefins;
(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;
(h) optionally, separating and removing light or heavy hydrocarbons that are not within the $C_5$-$C_{16}$ range, from the hydrocarbon stream;
(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and
(j) recovering the stabilized $C_5$-$C_{16}$ mixed hydrocarbons as aviation fuel.

Other variations provide a process for producing aviation fuel from syngas, the process comprising:
(a) providing a starting syngas stream comprising $H_2$ and CO;
(b) purifying the syngas feed stream to generate a clean syngas stream;
(c) optionally, adjusting the $H_2$/CO ratio of the starting syngas stream or the clean syngas stream;
(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_{10}$ mixed-alcohol stream and a reactor off-gas;
(e) optionally, purifying the $C_3$-$C_{10}$ mixed-alcohol stream to generate a clean $C_3$-$C_{10}$ mixed-alcohol stream;
(f) feeding the $C_3$-$C_{10}$ mixed-alcohol stream or, if step (e) is conducted, the clean $C_3$-$C_{10}$ mixed-alcohol stream to a dehydration reactor operated at effective alcohol-dehydration conditions and in the presence of a dehydration catalyst, to catalytically convert at least a portion of the $C_3$-$C_{10}$ mixed alcohols to $C_3$-$C_{10}$ mixed olefins;
(g) feeding the $C_3$-$C_{10}$ mixed olefins to an oligomerization reactor operated at effective oligomerization conditions and in the presence of an oligomerization catalyst, to catalytically convert at least a portion of the $C_3$-$C_{10}$ mixed olefins to a hydrocarbon stream comprising $C_5$-$C_{16}$ mixed hydrocarbons;
(h) optionally, separating and removing light or heavy hydrocarbons that are not within the $C_5$-$C_{16}$ range, from the hydrocarbon stream;
(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and
(j) recovering the stabilized $C_5$-$C_{16}$ mixed hydrocarbons as aviation fuel.

Certain variations provide a process for producing aviation fuel from syngas, the process comprising:
(a) providing a starting syngas stream comprising $H_2$ and CO;
(b) purifying the syngas feed stream to generate a clean syngas stream;
(c) optionally, adjusting the $H_2$/CO ratio of the starting syngas stream or the clean syngas stream;
(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_6$ mixed-alcohol stream and a reactor off-gas;

(e) optionally, purifying the $C_3$-$C_6$ mixed-alcohol stream to generate a clean $C_3$-$C_6$ mixed-alcohol stream;

(f) feeding the $C_3$-$C_6$ mixed-alcohol stream or, if step (e) is conducted, the clean $C_3$-$C_6$ mixed-alcohol stream to a dehydration reactor operated at effective alcohol-dehydration conditions and in the presence of a dehydration catalyst, to catalytically convert at least a portion of the $C_3$-$C_6$ mixed alcohols to $C_3$-$C_6$ mixed olefins;

(g) feeding the $C_3$-$C_6$ mixed olefins to an oligomerization reactor operated at effective oligomerization conditions and in the presence of an oligomerization catalyst, to catalytically convert at least a portion of the $C_3$-$C_6$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Certain variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_3$-$C_4$ mixed-alcohol stream and a reactor off-gas;

(e) optionally, purifying the $C_3$-$C_4$ mixed-alcohol stream to generate a clean $C_3$-$C_4$ mixed-alcohol stream;

(f) feeding the $C_3$-$C_4$ mixed-alcohol stream or, if step (e) is conducted, the clean $C_3$-$C_4$ mixed-alcohol stream to a dehydration reactor operated at effective alcohol-dehydration conditions and in the presence of a dehydration catalyst, to catalytically convert at least a portion of the $C_3$-$C_4$ mixed alcohols to $C_2$-$C_4$ mixed olefins;

(g) feeding the $C_2$-$C_4$ mixed olefins to an oligomerization reactor operated at effective oligomerization conditions and in the presence of an oligomerization catalyst, to catalytically convert at least a portion of the $C_2$-$C_4$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Other variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, including alcohol recycle back to the alcohol-synthesis reactor, and in the presence of an alcohol-synthesis catalyst, to catalytically convert at least a portion of the $H_2$ and the CO to a $C_6$-$C_{16}$ mixed-alcohol stream and a reactor off-gas;

(e) optionally, purifying the $C_6$-$C_{16}$ mixed-alcohol stream to generate a clean $C_6$-$C_{16}$ mixed-alcohol stream;

(f) feeding the $C_6$-$C_{16}$ mixed-alcohol stream or, if step (e) is conducted, the clean $C_6$-$C_{16}$ mixed-alcohol stream to a dehydration reactor operated at effective alcohol-dehydration conditions and in the presence of a dehydration catalyst, to catalytically convert at least a portion of the $C_6$-$C_{16}$ mixed alcohols to $C_6$-$C_{16}$ mixed olefins;

(g) optionally, feeding the $C_6$-$C_{16}$ mixed olefins to an oligomerization reactor operated at effective oligomerization conditions and in the presence of an oligomerization catalyst, to catalytically convert at least a portion of the $C_6$-$C_{16}$ mixed olefins to a hydrocarbon stream comprising $C_6$-$C_{16}$ mixed hydrocarbons;

(h) optionally, separating and removing light or heavy hydrocarbons that are not within the $C_6$-$C_{16}$ range, from the hydrocarbon stream;

(i) feeding hydrogen and the $C_6$-$C_{16}$ mixed olefins or, if step (g) is conducted, the $C_6$-$C_{16}$ mixed hydrocarbons to a hydrogenation reactor operated at effective hydrogenation conditions and in the presence of a hydrogenation catalyst, to catalytically hydrogenate at least some C=C double bonds within the $C_6$-$C_{16}$ mixed olefins or, of step (g) is conducted, within the $C_6$-$C_{16}$ mixed hydrocarbons, thereby generating stabilized $C_6$-$C_{16}$ mixed hydrocarbons; and (j) recovering the stabilized $C_6$-$C_{16}$ mixed hydrocarbons as aviation fuel.

Other variations provide a product produced by any one of the disclosed processes, wherein the product is preferably aviation fuel that meets all specifications under ASTM D1655-22a, and preferably also under ASTM D7566-24a.

Other variations provide a system configured to carry out any one of the disclosed processes.

DETAILED DESCRIPTION OF EMBODIMENTS OF THE INVENTION

Figure 1:
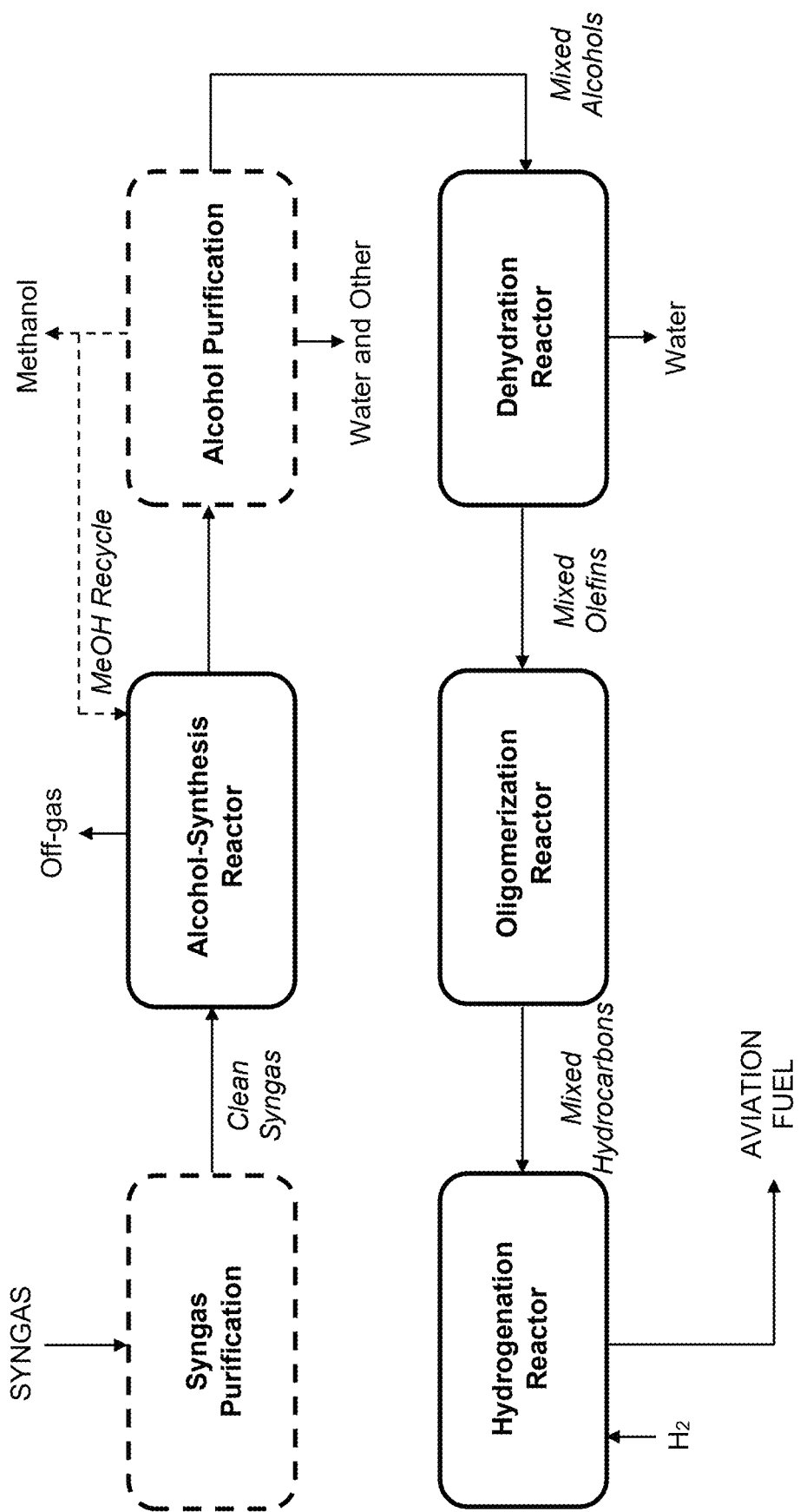
FIG. 1 is an exemplary block-flow diagram according to some embodiments for production of aviation fuel (e.g., SAF) starting from syngas, via intermediate production of mixed alcohols.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Ordinary mathematical rounding shall be applied with respect to integers. For example, a "mixed-alcohol number-average carbon number selected from 3 to 4" shall mean a number-average carbon number selected from 2.95 to 4.04.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

For purposes of an enabling technical disclosure, various explanations, hypotheses, theories, speculations, assumptions, and so on are disclosed. The present invention does not rely on any of these being in fact true. None of the explanations, hypotheses, theories, speculations, or assumptions in this detailed description shall be construed to limit the scope of the invention in any way.

Some variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_1$-$C_{10}$ mixed-alcohol stream and a reactor off-gas;

(e) optionally, purifying the $C_1$-$C_{10}$ mixed-alcohol stream to generate a clean $C_1$-$C_{10}$ mixed-alcohol stream;

(f) feeding the $C_1$-$C_{10}$ mixed-alcohol stream or, if step (e) is conducted, the clean $C_1$-$C_{10}$ mixed-alcohol stream to a dehydration reactor operated at effective alcohol-dehydration conditions and in the presence of a dehydration catalyst, to catalytically convert at least a portion of the $C_1$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

The starting syngas stream may be obtained from a source selected from the group consisting of methane steam reforming, methane autothermal reforming, methane partial oxidation, biomass gasification, waste polymer gasification, municipal solid waste gasification or plasma treatment, coal gasification, coke gasification, $CO_2$ conversion to syngas, and combinations thereof, for example. Other syngas sources may be used.

In some embodiments, the starting syngas stream is obtained from methane, wherein the methane is contained in biogas from anaerobic digestion.

In some embodiments, the starting syngas stream is obtained from methane, wherein the methane is contained in landfill biogas.

In some embodiments, the starting syngas stream is already sufficiently pure such that step (b) may be omitted. In these embodiments, the clean syngas stream may be considered equivalent to the starting syngas stream. That is, in these embodiments, all instances of "clean syngas stream" in the applicable process descriptions may be replaced with "starting syngas stream".

In some embodiments utilizing $CO_2$ as a syngas source, the $CO_2$ conversion to syngas utilizes electrochemical conversion of $CO_2$. Alternatively, or additionally, the $CO_2$ conversion to syngas may utilize water-gas shift chemistry. Alternatively, or additionally, the $CO_2$ conversion to syngas may utilize dry reforming of $CO_2$ with methane. Alternatively, or additionally, the $CO_2$ conversion to syngas may utilize the Sabatier reaction in which $CO_2$ reacts with $H_2$ to form $CH_4$ and $H_2O$; the $CH_4$ may in turn be converted to syngas, optionally using the Sabatier reaction product $H_2O$ in steam reforming of the $CH_4$.

In some embodiments, the starting syngas stream has a starting $H_2/CO$ ratio selected from about 0.7 to about 1.6. In certain embodiments, the starting $H_2/CO$ ratio is selected from about 0.8 to about 1.2. In various embodiments, the starting syngas stream has a starting $H_2/CO$ ratio of about, at least about, or at most about 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.55, or 1.6, including any intervening range. In other embodiments, the starting $H_2/CO$ ratio is less than 0.5 or greater than 1.6, in which case the $H_2/CO$ ratio is preferably adjusted as described below.

In some embodiments, the clean syngas stream has a reactor-feed $H_2/CO$ ratio selected from about 0.7 to about 1.6. In certain embodiments, the reactor-feed $H_2/CO$ ratio is selected from about 0.8 to about 1.2. In various embodiments, the clean syngas stream has a reactor-feed $H_2/CO$ ratio of about, at least about, or at most about 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.55, or 1.6, including any intervening range. In other embodiments, the clean syngas stream has a reactor-feed $H_2/CO$ ratio of about, or at most about, 1.65, 1.7, 1.75, 1.8, 1.85, 1.9, 1.95, or 2.0.

In various embodiments, the clean syngas stream has a reactor-feed $H_2/CO$ ratio of about, at least about, or at most about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, including any intervening range (e.g., 0.8-1.3, 0.6-1.8, etc.).

When it is desired to adjust the $H_2/CO$ ratio of the starting syngas stream, various techniques may be used, depending whether the $H_2/CO$ ratio is too high (e.g., $H_2/CO>1.6$) or too low (e.g., $H_2/CO<0.5$). The water-gas shift reaction ($CO+H_2O \leftrightarrows CO_2+H_2$) may be employed, in which $CO_2$ addition shifts the equilibrium toward lower $H_2/CO$ ratios, whereas $H_2O$ addition shifts the equilibrium toward higher $H_2/CO$ ratios (note that the kinetics are important for water-gas shift as well as the thermodynamic equilibrium). Preferential separation of $H_2$ may be used to reduce the $H_2/CO$ ratio, or preferential separation of CO may be used to increase the $H_2/CO$ ratio. Preferential separation of $H_2$ or CO may employ membranes, molecular sieves, cryogenic distillation, or chromatography, for example. Another way to adjust the $H_2/CO$ ratio of a syngas stream is not to remove anything, but rather add a $H_2$-rich gas—thereby increasing the $H_2/CO$ ratio. Similarly, by adding a CO-rich gas, the $H_2/CO$ ratio may be reduced.

Some embodiments utilize $H_2$ produced via water electrolysis, in combination with $CO_2$ recovered from low-quality syngas, separated from biogas, or recovered from the output stream of an alcohol-synthesis reactor, for example. A mixture of $H_2$ and $CO_2$ may be subjected to the reverse water-gas shift reaction to convert some of the $CO_2$ to CO, in order to achieve the desired $H_2/CO$ ratio for alcohol synthesis.

Many syngas sources have a starting $H_2/CO$ ratio of about 2 or higher, which is higher than usually preferred for making mixed alcohols. This presents both an advantage and an opportunity. Syngas with $H_2/CO$ ratios much less than 2 has historically been perceived to be of relatively low value, due to the higher energy value of $H_2$ compared to CO, and the fact that conventional methanol synthesis uses a $H_2/CO$ ratio usually around 2. Beneficially, the starting syngas can have a lower $H_2/CO$ ratio, which means less hydrogen needs to be present on a molar-concentration basis. Conversely, when excess hydrogen is present, it can be recovered prior to processing. For example, when the starting syngas stream contains excess $H_2$ relative to a selected reactor-feed $H_2/CO$ ratio, the excess $H_2$ is optionally separated from the starting syngas stream or from the clean syngas stream. The excess $H_2$ may be sold. Optionally, the excess $H_2$ may be utilized as at least some of the hydrogen in step (i) as feed to the hydrogenation reactor, if desired, which would displace hydrogen needs in that part of the process.

A syngas stream that has optionally been cleaned/purified, and which has undergone an adjustment of its $H_2/CO$ ratio, may be referred to herein as "spec syngas" (e.g., see FIG. 4) to indicate that a specification of $H_2/CO$ ratio has been met.

In this specification, "$C_1$-$C_{10}$ mixed alcohols" means a mixture containing at least two alcohols each having a carbon number from one to ten. As is known, methanol has one carbon atom, ethanol has two carbon atoms, propanol has three carbon atoms, butanol has four carbon atoms, pentanol has five carbon atoms, hexanol has six carbon atoms, heptanol has seven carbon atoms, octanol has eight carbon atoms, nonanol has nine carbon atoms, and decanol has ten carbon atoms. Any isomers may be present, including linear, branched, or cyclic alcohols. For example, in the case of $C_6$ alcohols, linear n-hexanol is typical, but branched $C_6$ alcohols (e.g., 4-methyl-1-pentanol) or cyclic $C_6$ alcohols (e.g., cyclohexanol) may be present. The alcohol-OH group is typically at the 1-position (e.g., 1-hexanol), but may be at other positions (e.g., 2-hexanol in which the —OH group is at position 2).

Typically, and preferably, the concentration of ethanol exceeds the concentration of methanol. Generally speaking, when producing aviation fuel which contains e.g. $C_8$-$C_{16}$ hydrocarbons, it is advantageous for the mixed alcohols to be weighted toward higher alcohols (i.e., $C_{2+}$ alcohols). The energy density of alcohols increases with carbon number.

When step (e) is omitted, the $C_1$-$C_{10}$ mixed-alcohol stream may be referred to as a clean $C_1$-$C_{10}$ mixed-alcohol stream since the stream is sufficiently clean for downstream processing.

In some embodiments, the clean $C_1$-$C_{10}$ mixed-alcohol stream is a $C_2$-$C_5$ mixed-alcohol stream. A "$C_2$-$C_5$ mixed-alcohol stream" means a stream with at least two of ethanol, propanol, butanol, and pentanol (including any isomers), optionally at least three of these alcohols, and possibly all four of these alcohols.

The $C_1$-$C_{10}$ mixed-alcohol stream is characterized by a number-average carbon number of the alcohols present. The "number-average carbon number" is determined by multiplying the number of carbon atoms of each alcohol in the mixture by the weight percent of that alcohol and then adding the products. For example, the number-average carbon number of an alcohol mixture containing 10% by weight ethanol, 50% by weight propanol, and 40% by weight butanol is (2×0.10)+ (3×0.50)+ (4×0.40)=3.3.

In some embodiments, the clean $C_1$-$C_{10}$ mixed-alcohol stream has a number-average carbon number selected from 2 to 5. In certain embodiments, the clean $C_1$-$C_{10}$ mixed-alcohol stream has a number-average carbon number selected from 3 to 5. In certain embodiments, the clean $C_1$-$C_{10}$ mixed-alcohol stream has a number-average carbon number selected from 2 to 4. In some embodiments, the clean $C_1$-$C_{10}$ mixed-alcohol stream has a number-average carbon number selected from 3 to 6. In certain embodiments, the clean $C_1$-$C_{10}$ mixed-alcohol stream has a number-average carbon number selected from 3 to 4. In various embodiments, the clean $C_1$-$C_{10}$ mixed-alcohol stream has a number-average carbon number of about, at least about, or at most about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0, including any intervening range. In other embodiments, discussed later, the number-average carbon number is higher than 6.0.

The number-average carbon number may be controlled and/or optimized by changing reaction conditions during mixed-alcohol synthesis, by using recycle of alcohols back to the reactor (e.g., a higher methanol recycle rate), and/or by using catalysts that favor higher alcohols, for example. An exemplary catalyst that favors higher alcohols is potassium-promoted, vanadium-containing cobalt-molybdenum sulfide catalyst, described in U.S. Pat. No. 10,875,820, which is incorporated by referenced.

The number-average carbon number can also be increased or decreased by adjusting the $H_2$/CO ratio of the starting syngas, for example. Generally speaking, lower $H_2$/CO ratios favor higher alcohols, all other things being the same. The number-average carbon number of the alcohols also tends to be higher at lower per-pass reactor conversion of CO. The per-pass reactor conversion of CO can, in turn, be controlled by reactor temperature and pressure, residence time, choice of catalyst, and the per-pass concentrations of CO and $H_2$.

In preferred embodiments, the clean $C_1$-$C_{10}$ mixed-alcohol stream has a number-average carbon number selected based on the influence of the number-average carbon number on downstream process performance in step (f), step (g), and/or step (i). In some embodiments, the clean $C_1$-$C_{10}$ mixed-alcohol stream has a number-average carbon number selected based on the influence of the number-average carbon number on final product properties, including (but not limited to) the degree of hydrocarbon branching.

Note that in a $C_1$-$C_{10}$ mixed-alcohol stream, there may be a minor amount of $C_{11+}$ alcohols present. A "minor amount" is generally less than 0.1 wt % of any particular $C_{11+}$ alcohol, and less than 1 wt % of all $C_{11+}$ alcohols combined.

An exemplary mixture of $C_1$-$C_{10}$ mixed alcohols is, by weight:
 0-30% methanol;
 40-80% ethanol;
 10-30% propanol;
 4-20% butanol;
 1-8% pentanol;
 0-6% hexanol;
 0-6% heptanol;
 0-6% octanol;
 0-3% nonanol; and
 0-3% decanol.

Another exemplary mixture of $C_1$-$C_{10}$ mixed alcohols is, by weight:
 0-20% methanol;
 20-60% ethanol;
 10-30% propanol;
 6-20% butanol;
 3-10% pentanol;
 0-8% hexanol;
 0-6% heptanol;
 0-6% octanol;
 0-3% nonanol; and
 0-3% decanol.

Another exemplary mixture of $C_1$-$C_6$ mixed alcohols is, by weight:
 1-10% methanol;
 25-75% ethanol;
 10-25% propanol;
 2-20% butanol;
 0.1-8% pentanol; and
 0-2% hexanol.

A specific exemplary mixture of $C_1$-$C_6$ mixed alcohols, by weight, is as follows which can be achieved using methanol recycle, resulting in a number-average carbon number of about 2.2:
 10% methanol;
 62% ethanol;
 19% propanol;
 7% butanol;
 1% pentanol; and
 0% hexanol.

Another specific exemplary mixture of $C_1$-$C_6$ mixed alcohols, by weight, is as follows which can be achieved using methanol separation, resulting in a number-average carbon number of about 2.4:
 1% methanol;
 73% ethanol;
 19% propanol;
 5% butanol;
 1% pentanol; and
 1% hexanol.

Mixed alcohols may be converted to hydrocarbons by first converting the mixed alcohols to mixed olefins, oligomerizing the olefins to larger olefins, and then hydrotreating the larger olefins into hydrocarbons. Mäki-Arvela et al., *ChemCatChem* 2022, 14, e202201005 and Díaz-Pérez et al., *Molecules* 2020, 25, 802, are each hereby incorporated by reference herein.

Exemplary dehydration catalysts include, but are not limited to, $Al_2O_3$/ZSM-5, $Ti(OTf)_4$, $Fe(OTf)_3$, $TiO_2/Al_2O_3$, and $Ag_3PW_{12}O_{40}$.

Olefins (alkenes) include ethylene, propylene, butenes, pentenes, hexenes, and larger olefins. For $C_{3+}$ olefins, there are various isomers for a given olefin chain size, depending on the position of the C=C bond(s). In addition to the possibility of multiple C=C bonds in a single molecule, alkynes may be produced, containing a C≡C triple bond. Generally speaking, the light olefins ethylene and propylene may be produced in the dehydration reactor even when $C_{3+}$ alcohols are fed to that reactor.

From the perspective of carbon chain growth, it is preferable to form larger olefins, closer to the ultimate chain size ($C_5$-$C_{16}$) in the final aviation fuel. However, $C_2$-$C_4$ mixed olefins are beneficial in some embodiments to cause a higher degree of hydrocarbon branching during oligomerization and in the final aviation fuel. The benefit can arise when using only $C_2$-$C_4$ mixed olefins, or when using mixed olefins that also contain higher ($C_{5+}$) olefins, such as $C_2$-$C_{10}$ mixed olefins. Without being limited by theory, it is believed that the acid-catalyzed oligomerization of linear higher olefins (e.g., $C_{6+}$ α-olefins) with ethylene and/or propylene leads to high fractions of branched (versus linear) $C_8$-$C_9$ isomers. In addition to straight oligomerization, there can be metathesis and cracking reactions that redistribute carbon-carbon bonds (both single and double bonds), leading to further branching.

Exemplary oligomerization catalysts include, but are not limited to, organometallic catalysts, solid phosphoric acid, alumina-silica, nickel-alumina-silica, sulfonic acid resins, zeolites, and metal-modified zeolites.

When olefins are oligomerized, two C═C bonds from different molecules combine to form a single C—C bond and usually a remaining double bond. If sufficient hydrogen is present, the remaining double bond may be converted to a single bond, but typically a final hydrogenation is required to stabilize the oligomerized hydrocarbons. Olefins are limited to 1 vol % in aviation fuel according to the ASTM D7566-24a specification.

Exemplary hydrogenation catalysts include, but are not limited to, cobalt, nickel, palladium, platinum, rhodium, ruthenium, iridium, oxides thereof, and combinations of the foregoing. The hydrogenation catalyst may also have hydrotreating or hydrodesulfurization activity. The hydrogenation catalyst may be CoMo or a sulfide thereof, for example. In some embodiments, the hydrogenation catalyst is compositionally the same as the alcohol-synthesis catalyst.

In some embodiments, the $C_5$-$C_{16}$ mixed hydrocarbons are $C_8$-$C_{16}$ mixed hydrocarbons. In other embodiments, the $C_5$-$C_{16}$ mixed hydrocarbons are $C_5$-$C_{15}$ mixed hydrocarbons. Different types of aviation fuel have different ranges of carbon number. Kerosene-type jet fuel (including Jet A and Jet A-1, JP-5, and JP-8) has a carbon number distribution between about 8 and 16 (carbon atoms per molecule). Wide-cut or naphtha-type jet fuel (including Jet B and JP-4) has a carbon number distribution between about 5 and 15.

The process may further comprise a step of feeding a portion of the starting syngas stream and/or the clean syngas stream, as an aromatics-allocated syngas stream, to a syngas-to-aromatics reactor operated at effective aromatization conditions in the presence of an aromatization catalyst, to catalytically convert at least a portion of the aromatics-allocated syngas stream to a $C_6$-$C_{16}$ mixed aromatics stream. Exemplary aromatization catalysts for converting syngas to aromatics include, but are not limited to, Fe/MnO mixed with gallium-modified ZSM-5, and Na/Zn/FesC$_2$/ZSM-5 (ZSM-5 is a zeolite). The $C_6$-$C_{16}$ mixed aromatics stream may be combined with the stabilized $C_5$-$C_{16}$ mixed hydrocarbons to generate an aromatics-containing aviation fuel.

Alternatively, or additionally, the process may further comprise a step of feeding a portion of the $C_1$-$C_{10}$ mixed-alcohol stream and/or the clean $C_1$-$C_{10}$ mixed-alcohol stream, as an aromatics-allocated alcohol stream, to an alcohol-to-aromatics reactor operated at effective aromatization conditions in the presence of an aromatization catalyst, to catalytically convert at least a portion of the aromatics-allocated alcohol stream to a $C_6$-$C_{16}$ mixed aromatics stream. Exemplary aromatization catalysts for converting alcohols to aromatics include, but are not limited to, ZSM-5 with ZnO, CuO, CoO, and/or $Ga_2O_3$. The $C_6$-$C_{16}$ mixed aromatics stream may be combined with the stabilized $C_5$-$C_{16}$ mixed hydrocarbons to generate an aromatics-containing aviation fuel.

In various embodiments, the $C_6$-$C_{16}$ mixed aromatics are $C_6$-$C_{12}$ mixed aromatics, $C_6$-$C_{10}$ mixed aromatics, $C_6$-$C_8$ mixed aromatics, or $C_6$-$C_8$ mixed aromatics. An example of $C_6$-$C_8$ mixed aromatics is a mixture of benzene, toluene, ethylbenzene, and xylenes, commonly referred to as "BTEX".

Aromatics (e.g., BTEX) are helpful in aviation fuel for suitable swell of seals in the aircraft fuel system, for example. In some embodiments, the aromatics-containing aviation fuel contains from about 8 vol % to about 20 vol % total aromatics content. In various embodiments, the aromatics-containing aviation fuel contains about, at least about, or at most about 1, 2, 3, 4, 5, 6, 7, 8, 9, 10, 11, 12, 13, 14, 15, 16, 17, 18, 19, 20, 21, 22, 23, 24, or 25 vol %, including any intervening range. The aviation fuel disclosed herein does not necessarily contain aromatic compounds; it is possible to blend the syngas-derived aviation fuel with another aromatics source, or use the aviation fuel in an aviation system that does not require aromatics.

In some embodiments, the process further comprises isomerizing a portion of the mixed olefins (e.g., $C_2$-$C_{10}$ mixed olefins) to create branched olefins (e.g., branched $C_2$-$C_{10}$ olefins). An example of a branched $C_8$ olefin is 6-methyl-1-heptene. In a branched olefin, a C═C double bond may be in the main chain or side chains. An isomerization catalyst may be utilized to assist olefin isomerization. Examples of olefin isomerization catalysts include metal oxides such as $Al_2O_3$, $SiO_2$, WO3; mesoporous Ti, Nb or Ta oxides; and transition metal hydrides, such as cobalt tetracarbonyl hydride, $HCo(CO)_4$. As explained elsewhere, the use of mixed olefins tends to lead to branched oligomers, so the degree of branching may be sufficient even without a separate step of isomerization.

In some embodiments, the process further comprises isomerizing a portion of the $C_5$-$C_{16}$ mixed hydrocarbons, before step (i) or during step (i), to create branched $C_5$-$C_{16}$ hydrocarbons. A hydroisomerization catalyst may be utilized to assist isomerization during olefin hydrogenation. Examples of hydroisomerization catalysts include, but are not limited to, $Pt/Al_2O_3/Cl$ and Pt/SAPO-11.

In some embodiments, the process further comprises removal of at least some methanol in an output stream from the alcohol-synthesis reactor, as removed methanol. In certain embodiments, the removed methanol is substantially all methanol in the output stream from the alcohol-synthesis reactor. The process may further comprise recycle of at least some of the removed methanol, or recycle of substantially all of the removed methanol. Alternatively, or additionally, methanol may be sold or used for purposes other than conversion to aviation fuel.

In some embodiments, the process further comprises separating a methanol-rich stream from the $C_1$-$C_{10}$ mixed-alcohol stream, prior to step (e). In other embodiments, the process further comprises separating a methanol-rich stream from the $C_1$-$C_{10}$ mixed-alcohol stream, during the purifying in step (e). In still other embodiments, the process further comprises separating a methanol-rich stream from the $C_1$-$C_{10}$ mixed-alcohol stream, after step (e). For example, the process may comprise separating a methanol-rich stream from the clean $C_1$-$C_{10}$ mixed-alcohol stream, prior to step (f). A methanol-rich stream is at least 51 wt % methanol, preferably at least 75 wt % methanol, and more preferably at least 90 wt % methanol. A purified methanol co-product may be produced from a methanol-rich stream, if desired.

In certain embodiments, the process includes separating a methanol-rich stream from the $C_1$-$C_{10}$ mixed-alcohol stream. The methanol-rich stream may be fed to a methanol-to-olefins reactor that is distinct from the dehydration reactor, generating methanol-derived olefins (typically a mixture of ethylene and propylene) using well-known chemistry. See Tian et al., "Methanol to Olefins (MTO): From Fundamentals to Commercialization", *ACS Catalysis*, 2015, 5, 1922-1938, which is incorporated by reference. The methanol-derived olefins may be converted to methanol-derived aviation fuel, using oligomerization and hydrogenation. The methanol-derived aviation fuel is optionally combined with the aviation fuel from step (j) to increase the overall production of aviation fuel.

In certain embodiments, substantially no methanol feeds into the dehydration reactor in step (f). "Substantially no methanol" here recognizes that impurity levels of methanol may still be present in a nominally $C_{2+}$ mixed-alcohol stream. The feed stream to the dehydration reactor may contain less than 1 wt % methanol, less than 0.5 wt % methanol, less than 0.1 wt % methanol, or less than 0.01 wt % methanol, for example.

In various embodiments, the alcohol stream fed to step (f) contains about, or at most about, 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 wt % methanol, including any intervening range.

In some processes, in step (d), the alcohol-synthesis catalyst is a metal sulfide catalyst, such as a sulfided cobalt-molybdenum catalyst. The sulfided cobalt-molybdenum catalyst may be potassium-promoted. Alternatively, or additionally, the sulfided cobalt-molybdenum catalyst may contain vanadium, which may itself be sulfided. The metal sulfide catalyst may be established in situ in the reactor by sulfiding a metal precursor, disposed within the reactor, using a sulfur-containing agent that passes through the reactor prior to mixed-alcohol synthesis or potentially in a sulfiding campaign during mixed-alcohol synthesis.

In some embodiments, the $C_1$-$C_{10}$ mixed-alcohol stream is produced by passing synthesis gas over a potassium-promoted CoS—$MoS_2$ catalyst at a temperature of about 300° C. and a pressure of about 100 bar. See U.S. Pat. No. 8,921,431 as well as U.S. Pat. No. 9,290,425, which are hereby incorporated by reference for their teachings of mixed-alcohol synthesis.

In some embodiments, the $C_1$-$C_{10}$ mixed-alcohol stream is produced by passing synthesis gas over a potassium-promoted, vanadium-containing cobalt-molybdenum sulfide catalyst, as disclosed in U.S. Pat. No. 10,875,820 which is hereby incorporated by reference. In this patent, the inventors (Tijm et al.) found that using vanadium in the catalyst increases the yield of higher alcohols, i.e. shifts the mixed alcohols to a higher number-average carbon number.

The present invention is not limited by the composition of the alcohol-synthesis catalyst. The alcohol-synthesis catalyst may contain Co, Mo, K, V, Cu, Fe, Si, Mg, Mn, Zn, Al, Zr, Rh, Pt, Au, Ag, or P, or oxides, sulfides, carbides, nitrides, or hydrides thereof, or combinations of the foregoing, for example.

The reactor output may contain other compounds besides alcohols or unreacted syngas. Such compounds may include water, esters, hydrocarbons, and sulfur compounds. Step (c), when performed, may include one or more of sulfur removal, water removal, and distillation.

In some embodiments, the reactor off-gas is recycled to step (b). Optionally, the reactor off-gas is first treated to remove contaminants, to remove $H_2O$, to remove $CO_2$, or to adjust $H_2$/CO ratio, for example, prior to recycling to step (b). The reactor off-gas may also be returned to the reactor inlet directly, rather than being combined with the starting syngas stream or the clean syngas stream.

In some embodiments, step (h) is conducted to remove light or heavy hydrocarbons that are not within the $C_5$-$C_{16}$ range, from the hydrocarbon stream. Step (h) may utilize evaporation or distillation, for example.

Heat integration may be applied to the process, such as by taking heat from an exothermic step and using it in an endothermic step. The process may use heat evolved from at least one of step (d), step (g), or step (i), in at least one of step (f) or step (h).

In preferred embodiments, the aviation fuel qualifies as sustainable aviation fuel under ASTM D7566-24a. This patent application hereby incorporates by reference ASTM D7566-24A "Standard Specification for Aviation Turbine Fuel Containing Synthesized Hydrocarbons" (pages 1-40, including all annexes).

In certain embodiments, the aviation fuel does not necessarily qualify as a sustainable aviation fuel under ASTM D7566-24a, but still meets all specifications for aviation fuel pursuant to ASTM D1655-22a, "Standard Specification for Aviation Turbine Fuels", which is incorporated by reference.

The aviation fuel may be a blendstock to be added to another aviation fuel, such as one produced starting from petroleum in a traditional oil refinery. When blending is to be performed, the aviation fuel produced using the disclosed technology may form from 1 vol % to 90 vol % of the final aviation fuel, such as 10-80 vol %, 20-70 vol %, 30-60 vol %, or about 50 vol %, for example. In other embodiments, the aviation fuel produced using the disclosed technology is 100 vol % of the final aviation fuel product that is pumped into the fuel tank of an aircraft.

Some embodiments of the invention can be understood in reference to the accompanying drawings. The drawings in FIGS. 1 to 5 describe both processes and systems. Note that not all process (or system) boxes in FIGS. 1-5 are required in all embodiments. Dotted boxes and lines denote optional units and streams, respectively.

FIG. 1 is an exemplary block-flow diagram according to some embodiments for production of aviation fuel (e.g., SAF) starting from syngas, via intermediate production of mixed alcohols.

Figure 2:
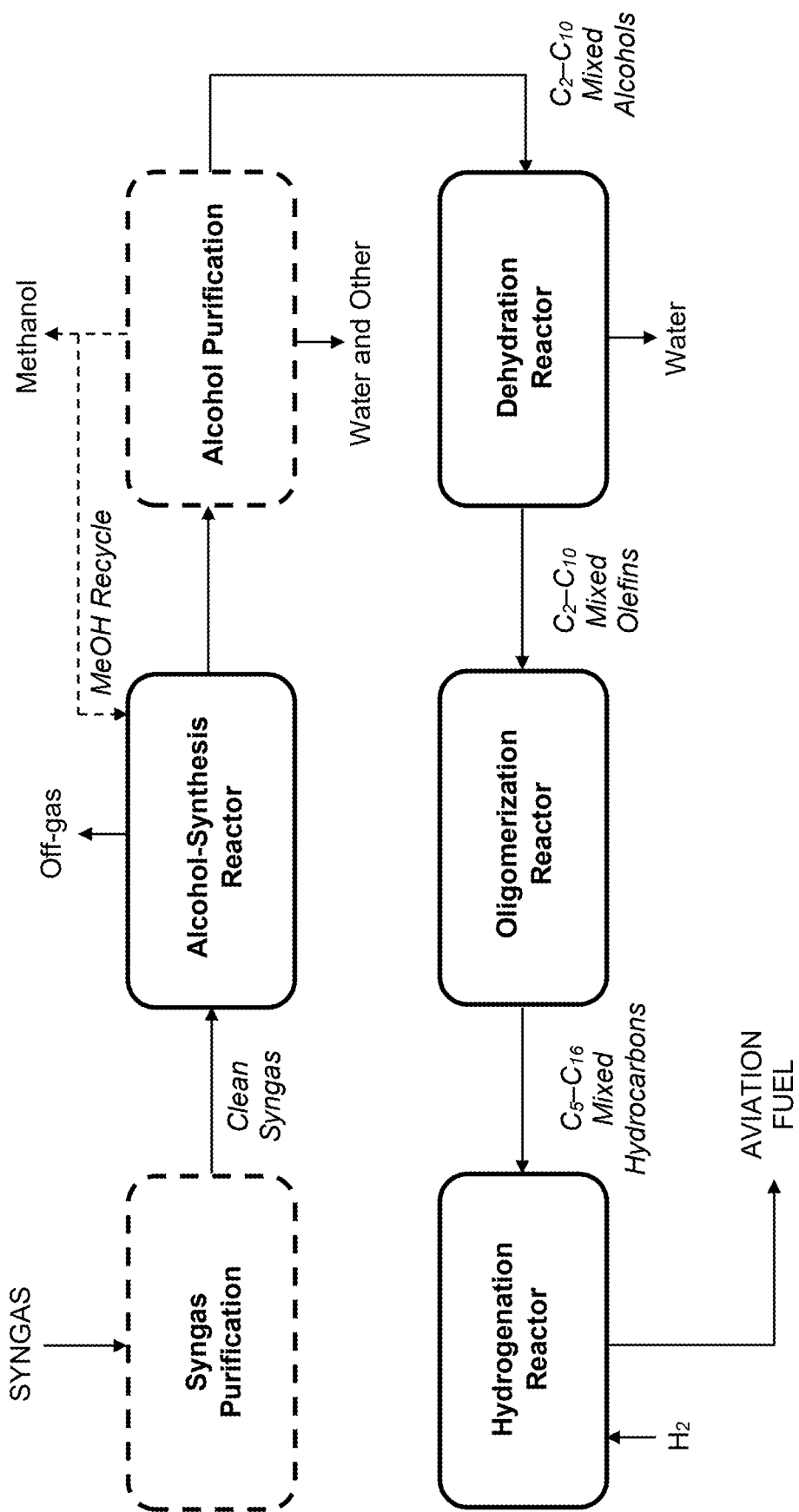
FIG. 2 is an exemplary block-flow diagram according to some embodiments for production of aviation fuel (e.g., SAF) starting from syngas, via intermediate production of $C_2$-$C_{10}$ mixed alcohols.

FIG. 2 is an exemplary block-flow diagram according to some embodiments for production of aviation fuel (e.g., SAF) starting from syngas, via intermediate production of $C_2$-$C_{10}$ mixed alcohols.

Figure 3:
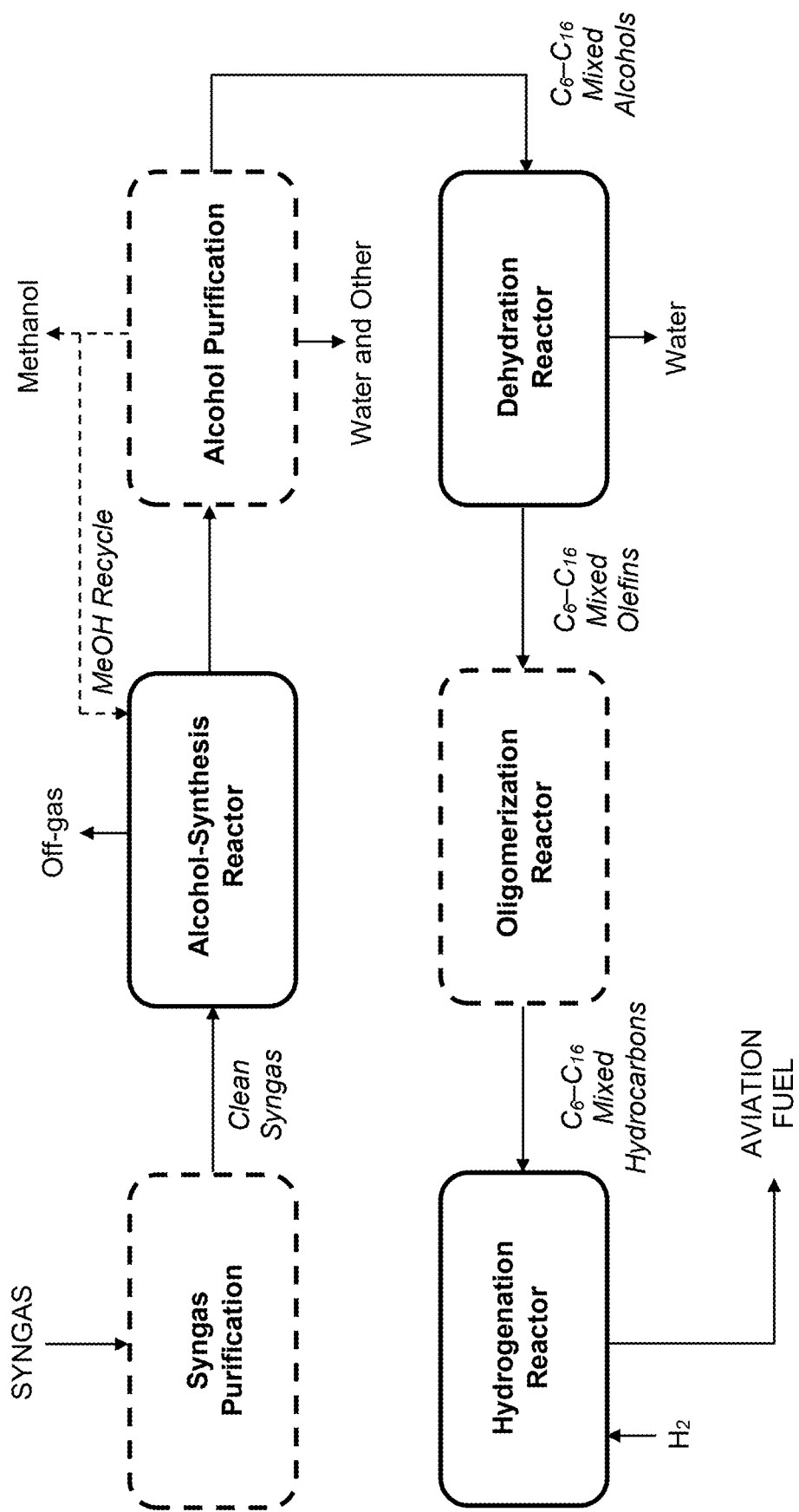
FIG. 3 is an exemplary block-flow diagram according to some embodiments for production of aviation fuel (e.g., SAF) starting from syngas, via intermediate production of $C_6$-$C_{16}$ mixed alcohols.

FIG. 3 is an exemplary block-flow diagram according to some embodiments for production of aviation fuel (e.g., SAF) starting from syngas, via intermediate production of $C_6$-$C_{16}$ mixed alcohols.

Figure 4:
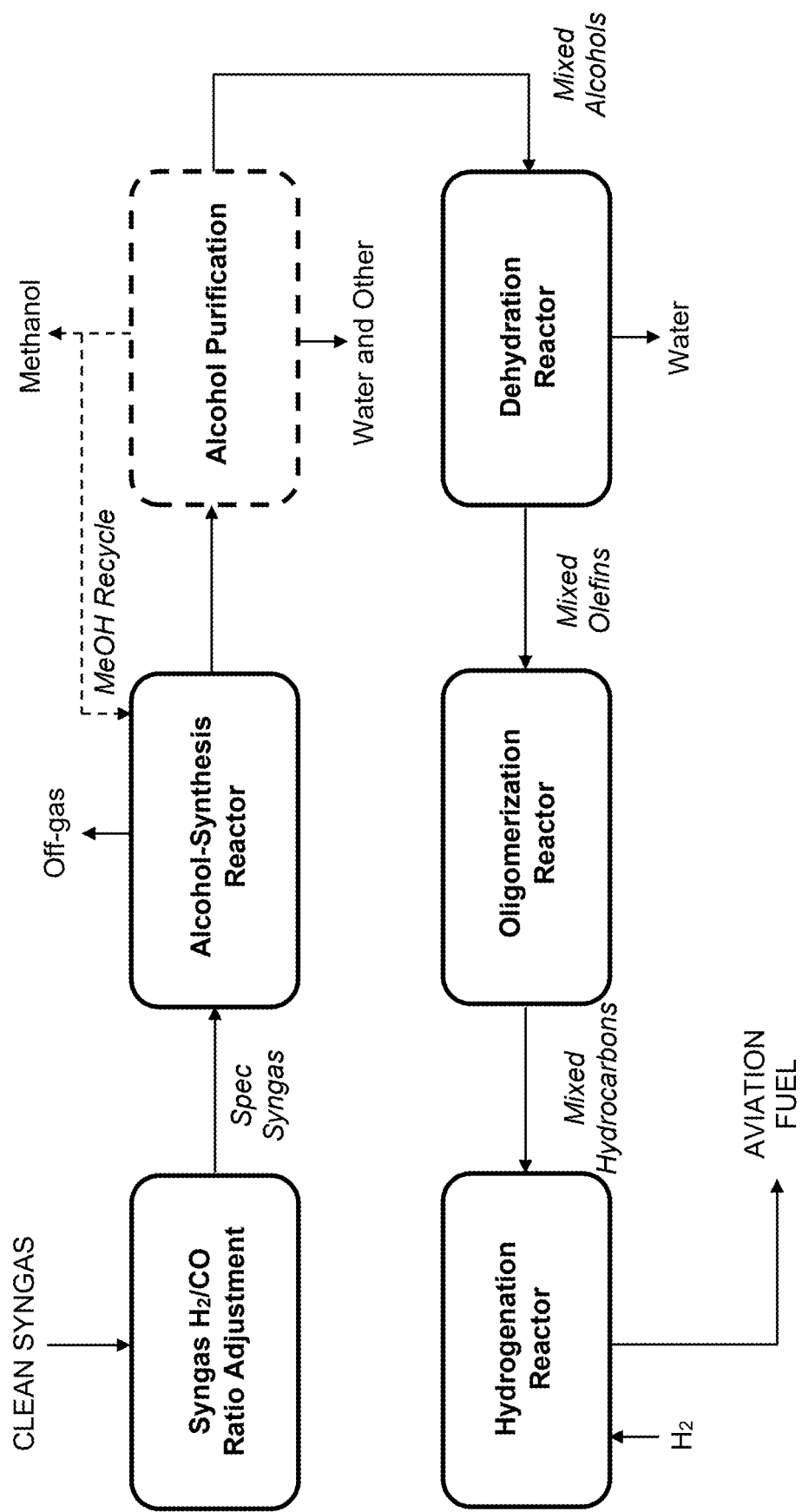
FIG. 4 is an exemplary block-flow diagram according to some embodiments for production of aviation fuel (e.g., SAF) starting from clean syngas, via intermediate production of mixed alcohols, with adjustment of the $H_2$/CO ratio of the starting syngas.

FIG. 4 is an exemplary block-flow diagram according to some embodiments for production of aviation fuel (e.g., SAF) starting from clean syngas, via intermediate production of mixed alcohols, with adjustment of the $H_2$/CO ratio of the starting syngas.

Figure 5:
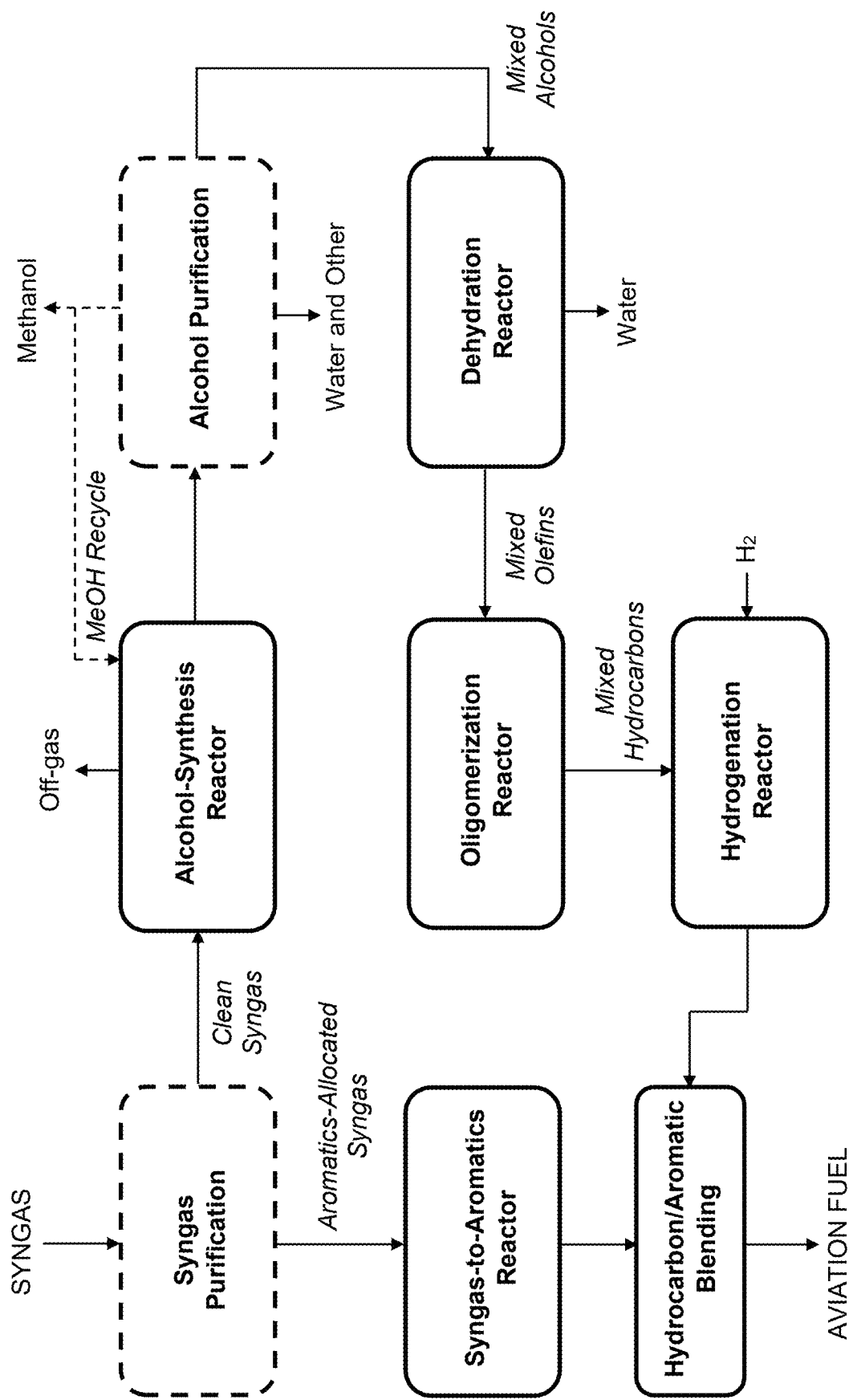
FIG. 5 is an exemplary block-flow diagram according to some embodiments for production of aviation fuel (e.g., SAF) starting from clean syngas, via intermediate production of mixed alcohols, with co-production of aromatics from a portion of the clean syngas.

FIG. 5 is an exemplary block-flow diagram according to some embodiments for production of aviation fuel (e.g., SAF) starting from clean syngas, via intermediate production of mixed alcohols, with co-production of aromatics from a portion of the clean syngas.

Some variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_2$-$C_{10}$ mixed-alcohol stream and a reactor off-gas;

(e) optionally, purifying the $C_2$-$C_{10}$ mixed-alcohol stream to generate a clean $C_2$-$C_{10}$ mixed-alcohol stream;

(f) feeding the $C_2$-$C_{10}$ mixed-alcohol stream or, if step (e) is conducted, the clean $C_2$-$C_{10}$ mixed-alcohol stream to a dehydration reactor operated at effective alcohol-dehydration conditions and in the presence of a dehydration catalyst, to catalytically convert at least a portion of the $C_2$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

A "$C_2$-$C_{10}$ mixed-alcohol stream" means a stream that contains less than 1 wt % methanol, preferably less than 0.5 wt % methanol, more preferably less than 0.1 wt % methanol, and most preferably less than 0.01 wt % methanol on a total weight basis including all components (including water). Note that in a $C_2$-$C_{10}$ mixed-alcohol stream, there may be a minor amount of $C_{11+}$ alcohols present.

Embodiments utilizing a $C_2$-$C_{10}$ mixed-alcohol stream, rather than a $C_1$-$C_{10}$ mixed-alcohol stream, are premised on the recognition that methanol has certain drawbacks as a starting alcohol for making aviation fuel. From a chemistry viewpoint, the hydrocarbons to be built require carbon-carbon bonds to be formed. Methanol has no carbon-carbon bonds, where $C_{2+}$ alcohols have an increasing number of carbon-carbon bonds as the carbon number of the alcohol increases. The oxygen content of methanol is high, at 50 wt % oxygen, compared to about 27 wt % oxygen for propanol, for example. Essentially all the oxygen needs to be rejected during synthesis of aviation fuel, so methanol as a starting feed has a high oxygen burden. Additionally, methanol is more corrosive than $C_{2+}$ alcohols, which can require higher-cost materials of construction.

In various embodiments, the $C_2$-$C_{10}$ mixed-alcohol stream has a number-average carbon number of about, at least about, or at most about 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0, including any intervening range.

Other variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_{10}$ mixed-alcohol stream and a reactor off-gas;

(e) optionally, purifying the $C_3$-$C_{10}$ mixed-alcohol stream to generate a clean $C_3$-$C_{10}$ mixed-alcohol stream;

(f) feeding the $C_3$-$C_{10}$ mixed-alcohol stream or, if step (e) is conducted, the clean $C_3$-$C_{10}$ mixed-alcohol stream to a dehydration reactor operated at effective alcohol-dehydration conditions and in the presence of a dehydration catalyst, to catalytically convert at least a portion of the $C_3$-$C_{10}$ mixed alcohols to $C_3$-$C_{10}$ mixed olefins;

(g) feeding the $C_3$-$C_{10}$ mixed olefins to an oligomerization reactor operated at effective oligomerization conditions and in the presence of an oligomerization catalyst, to catalytically convert at least a portion of the $C_3$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

A "$C_3$-$C_{10}$ mixed-alcohol stream" means a stream that contains less than 1 wt % (methanol plus ethanol), preferably less than 0.5 wt % (methanol plus ethanol), more preferably less than 0.1 wt % (methanol plus ethanol), and most preferably less than 0.01 wt % (methanol plus ethanol) on a total weight basis including all components (including water). Note that in a $C_3$-$C_{10}$ mixed-alcohol stream, there may be a minor amount of $C_{11+}$ alcohols present.

Embodiments utilizing a $C_3$-$C_{10}$ mixed-alcohol stream, rather than a $C_1$-$C_{10}$ mixed-alcohol stream or a $C_2$-$C_{10}$ mixed-alcohol stream, are premised on the recognition that methanol and ethanol have certain drawbacks as starting alcohols for making aviation fuel. From a chemistry viewpoint, the hydrocarbons to be built require carbon-carbon bonds to be formed. Methanol has no carbon-carbon bonds, while ethanol has only one carbon-carbon bond. $C_{3+}$ alcohols have an increasing number of carbon-carbon bonds as the carbon number of the alcohol increases. The oxygen content of methanol is high, at 50 wt % oxygen, while the oxygen content of ethanol is about 35 wt %. Essentially all the oxygen needs to be rejected during synthesis of aviation fuel, so methanol and to some extent ethanol as starting feeds have significant oxygen burdens. Additionally, both methanol and ethanol are more corrosive than $C_{3+}$ alcohols, which can require higher-cost materials of construction.

Another potential advantage of a $C_3$-$C_{10}$ mixed-alcohol stream relates to purification of the alcohols in step (e), if performed. For example, if distillation is used and the alcohols being purified are a distillation bottoms stream, the distillation overhead may be light alcohols being removed from the stream going to dehydration. The boiling temperature of water at atmospheric pressure is higher that of methanol and ethanol. This means that distillation that removes water will also tend to remove ethanol and methanol. Water being fed to the dehydration reactor may disrupt the dehydration chemistry, so preferably water is removed. If distillation is employed, methanol and ethanol will tend to be removed as well. A further separation of the methanol/ethanol from the water may be performed on the overhead stream, using membrane separation, azeotropic distillation, molecular sieve adsorption, or extractive distillation, with the methanol and ethanol optionally recycled to the feed stream of the alcohol-synthesis reactor.

In various embodiments, the $C_3$-$C_{10}$ mixed-alcohol stream has a number-average carbon number of about, at least about, or at most about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0, including any intervening range.

Certain variations provide a process for producing aviation fuel from syngas, the process comprising:
  (a) providing a starting syngas stream comprising $H_2$ and CO;
  (b) purifying the syngas feed stream to generate a clean syngas stream;
  (c) optionally, adjusting the $H_2$/CO ratio of the starting syngas stream or the clean syngas stream;
  (d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_6$ mixed-alcohol stream and a reactor off-gas;
  (e) optionally, purifying the $C_3$-$C_6$ mixed-alcohol stream to generate a clean $C_3$-$C_6$ mixed-alcohol stream;
  (f) feeding the $C_3$-$C_6$ mixed-alcohol stream or, if step (e) is conducted, the clean $C_3$-$C_6$ mixed-alcohol stream to a dehydration reactor operated at effective alcohol-dehydration conditions and in the presence of a dehydration catalyst, to catalytically convert at least a portion of the $C_3$-$C_6$ mixed alcohols to $C_3$-$C_6$ mixed olefins;
  (g) feeding the $C_3$-$C_6$ mixed olefins to an oligomerization reactor operated at effective oligomerization conditions and in the presence of an oligomerization catalyst, to catalytically convert at least a portion of the $C_3$-$C_6$ mixed olefins to a hydrocarbon stream comprising $C_5$-$C_{16}$ mixed hydrocarbons;
  (h) optionally, separating and removing light or heavy hydrocarbons that are not within the $C_5$-$C_{16}$ range, from the hydrocarbon stream;
  (i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and
  (j) recovering the stabilized $C_5$-$C_{16}$ mixed hydrocarbons as aviation fuel.

A "$C_3$-$C_6$ mixed-alcohol stream" means a stream that contains less than 1 wt % ($C_1$+$C_2$+$C_{7+}$ alcohols), preferably less than 0.5 wt % ($C_1$+$C_2$+$C_{7+}$ alcohols), more preferably less than 0.1 wt % ($C_1$+$C_2$+$C_{7+}$ alcohols), and most preferably less than 0.01 wt % ($C_1$+$C_2$+$C_{7+}$ alcohols) on a total weight basis including all components (including water).

In various embodiments, the $C_3$-$C_6$ mixed-alcohol stream has a number-average carbon number of about, at least about, or at most about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0, including any intervening range.

Other variations provide a process for producing aviation fuel from syngas, the process comprising:
  (a) providing a starting syngas stream comprising $H_2$ and CO;
  (b) purifying the syngas feed stream to generate a clean syngas stream;
  (c) optionally, adjusting the $H_2$/CO ratio of the starting syngas stream or the clean syngas stream;
  (d) feeding the clean syngas stream to an alcohol-synthesis reactor operated at effective alcohol-synthesis conditions, including alcohol recycle back to the alcohol-synthesis reactor, and in the presence of an alcohol-synthesis catalyst, to catalytically convert at least a portion of the $H_2$ and the CO to a $C_6$-$C_{16}$ mixed-alcohol stream and a reactor off-gas;
  (e) optionally, purifying the $C_6$-$C_{16}$ mixed-alcohol stream to generate a clean $C_6$-$C_{16}$ mixed-alcohol stream;
  (f) feeding the $C_6$-$C_{16}$ mixed-alcohol stream or, if step (e) is conducted, the clean $C_6$-$C_{16}$ mixed-alcohol stream to a dehydration reactor operated at effective alcohol-dehydration conditions and in the presence of a dehydration catalyst, to catalytically convert at least a portion of the $C_6$-$C_{16}$ mixed alcohols to $C_6$-$C_{16}$ mixed olefins;
  (g) optionally, feeding the $C_6$-$C_{16}$ mixed olefins to an oligomerization reactor operated at effective oligomerization conditions and in the presence of an oligomerization catalyst, to catalytically convert at least a portion of the $C_6$-$C_{16}$ mixed olefins to a hydrocarbon stream comprising $C_6$-$C_{16}$ mixed hydrocarbons;
  (h) optionally, separating and removing light or heavy hydrocarbons that are not within the $C_6$-$C_{16}$ range, from the hydrocarbon stream;
  (i) feeding hydrogen and the $C_6$-$C_{16}$ mixed olefins or, if step (g) is conducted, the $C_6$-$C_{16}$ mixed hydrocarbons to a hydrogenation reactor operated at effective hydrogenation conditions and in the presence of a hydrogenation catalyst, to catalytically hydrogenate at least some C=C double bonds within the $C_6$-$C_{16}$ mixed olefins or, of step (g) is conducted, within the $C_6$-$C_{16}$ mixed hydrocarbons, thereby generating stabilized $C_6$-$C_{16}$ mixed hydrocarbons; and
  (j) recovering the stabilized $C_6$-$C_{16}$ mixed hydrocarbons as aviation fuel.

A "$C_6$-$C_{16}$ mixed-alcohol stream" means a stream that contains less than 1 wt % $C_{5-}$ alcohols, preferably less than 0.5 wt % $C_{5-}$ alcohols, more preferably less than 0.1 wt % $C_{5-}$ alcohols, and most preferably less than 0.01 wt % $C_{5-}$ alcohols on a total weight basis including all components (including water). "$C_{5-}$ alcohols" means all alcohols having less than 5 carbons per molecule. Note that in a $C_6$-$C_{16}$ mixed-alcohol stream, there may be a very minor amount of $C_{17+}$ alcohols present. A "very minor amount" is generally less than 0.01 wt % of any particular $C_{11+}$ alcohol, and less than 0.1 wt % of all $C_{17+}$ alcohols combined.

Typically, a single pass of syngas through the alcohol-synthesis reactor does not generate large quantities of $C_6$-$C_{16}$ alcohols. Reactor parameters including temperature, pressure, residence time, and catalyst composition can be adjusted to achieve higher concentrations of $C_6$-$C_{16}$ alcohols, compared to $C_5$ and smaller alcohols, in the product stream. Recycle of alcohols back to the reactor can be performed in order to allow the alcohol chains to continue to grow. High recycle rates can be used to shift the average carbon number to higher values.

In various embodiments, the $C_6$-$C_{16}$ mixed-alcohol stream has a number-average carbon number of about, at least about, or at most about 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.5, 11.0, 11.5, 12.0, 12.5, 13.0, 13.5, 14.0, 14.5, 15.0, 15.5, or 16.0, including any intervening range.

Embodiments utilizing a $C_6$-$C_{16}$ mixed-alcohol stream are premised on the realization that by starting with alcohols already having carbon numbers from six to sixteen, the required carbon-carbon bond formation has been performed during alcohol synthesis, and need not be performed in an oligomerization reactor. In some embodiments, the oligomerization reactor may therefore be omitted. The $C_6$-$C_{16}$ alcohols still need to be dehydrated to remove oxygen, forming C=C double bonds that need to be hydrogenated for fuel stability. These embodiments can also be thought of as using the alcohol-synthesis reactor to perform the chain building that would otherwise require oligomerization, recognizing that aviation fuel has a fixed carbon-number range (e.g., $C_5$-$C_{16}$, $C_8$-$C_{16}$, $C_5$-$C_{15}$, etc.).

Certain variations provide a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_3$-$C_4$ mixed-alcohol stream and a reactor off-gas;

(e) optionally, purifying the $C_3$-$C_4$ mixed-alcohol stream to generate a clean $C_3$-$C_4$ mixed-alcohol stream;

(f) feeding the $C_3$-$C_4$ mixed-alcohol stream or, if step (e) is conducted, the clean $C_3$-$C_4$ mixed-alcohol stream to a dehydration reactor operated at effective alcohol-dehydration conditions and in the presence of a dehydration catalyst, to catalytically convert at least a portion of the $C_3$-$C_4$ mixed alcohols to $C_2$-$C_4$ mixed olefins;

(g) feeding the $C_2$-$C_4$ mixed olefins to an oligomerization reactor operated at effective oligomerization conditions and in the presence of an oligomerization catalyst, to catalytically convert at least a portion of the $C_2$-$C_4$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

A "$C_3$-$C_4$ mixed-alcohol stream" means a stream that contains less than 1 wt % ($C_1$+$C_2$+$C_{5+}$ alcohols), preferably less than 0.5 wt % ($C_1$+$C_2$+$C_{5+}$ alcohols), more preferably less than 0.1 wt % ($C_1$+$C_2$+$C_{5+}$ alcohols), and most preferably less than 0.01 wt % ($C_1$+$C_2$+$C_{5+}$ alcohols) on a total weight basis including all components (including water).

In various embodiments, the $C_3$-$C_4$ mixed-alcohol stream has a number-average carbon number of about, at least about, or at most about 3.0, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, or 4.0, including any intervening range.

Note that in step (f), the $C_3$-$C_4$ mixed-alcohol stream, when catalytically dehydrated to olefins, can form ethylene, propylene, and butenes (including 1-butene, 2-butene, and isobutene). In certain embodiments, only $C_3$-$C_4$ mixed olefins are formed from $C_3$-$C_4$ mixed alcohols, i.e., there is substantially no ethylene formed. However, even though ethylene represents a loss of one carbon atom compared to a $C_3$ alcohol, there can be a chemistry advantage when ethylene is present in the olefins to be oligomerized, as explained previously (e.g., hydrocarbon branching is enhanced).

Embodiments utilizing a $C_3$-$C_4$ mixed-alcohol stream are premised on the recognition that methanol and ethanol have certain drawbacks as starting alcohols for making aviation fuel, as stated previously, while $C_{5+}$ alcohols may have other drawbacks. For example, when step (e) is performed to purify the alcohol stream prior to feeding to the dehydration reactor, using distillation, it can be energetically beneficial to keep the alcohol carbon number in the 3-4 range, rather than a higher range, if the alcohols being purified are an overhead product of distillation (e.g., the distillation bottoms being waxes or other undesired materials).

Some variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_1$-$C_{10}$ mixed-alcohol stream and a reactor off-gas;

(e) optionally, purifying the $C_1$-$C_{10}$ mixed-alcohol stream to generate a clean $C_1$-$C_{10}$ mixed-alcohol stream;

(f) feeding the $C_1$-$C_{10}$ mixed-alcohol stream or, if step (e) is conducted, the clean $C_1$-$C_{10}$ mixed-alcohol stream to a dehydration reactor operated at effective alcohol-dehydration conditions and in the presence of a dehydration catalyst, to catalytically convert at least a portion of the $C_1$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel, which preferably meets all specifications under ASTM D7566-24a.

Other variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_2$-$C_{10}$ mixed-alcohol stream and a reactor off-gas;

(e) optionally, purifying the $C_2$-$C_{10}$ mixed-alcohol stream to generate a clean $C_2$-$C_{10}$ mixed-alcohol stream;

(f) feeding the $C_2$-$C_{10}$ mixed-alcohol stream or, if step (e) is conducted, the clean $C_2$-$C_{10}$ mixed-alcohol stream to a dehydration reactor operated at effective alcohol-dehydration conditions and in the presence of a dehydration catalyst, to catalytically convert at least a portion of the $C_2$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel, which preferably meets all specifications under ASTM D7566-24a.

Other variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_{10}$ mixed-alcohol stream and a reactor off-gas;

(e) optionally, purifying the $C_3$-$C_{10}$ mixed-alcohol stream to generate a clean $C_3$-$C_{10}$ mixed-alcohol stream;

(f) feeding the $C_3$-$C_{10}$ mixed-alcohol stream or, if step (e) is conducted, the clean $C_3$-$C_{10}$ mixed-alcohol stream to a dehydration reactor operated at effective alcohol-dehydration conditions and in the presence of a dehydration catalyst, to catalytically convert at least a portion of the $C_3$-$C_{10}$ mixed alcohols to $C_3$-$C_{10}$ mixed olefins;

(g) feeding the $C_3$-$C_{10}$ mixed olefins to an oligomerization reactor operated at effective oligomerization conditions and in the presence of an oligomerization catalyst, to catalytically convert at least a portion of the $C_3$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel, which preferably meets all specifications under ASTM D7566-24a.

Other variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_6$ mixed-alcohol stream and a reactor off-gas;

(e) optionally, purifying the $C_3$-$C_6$ mixed-alcohol stream to generate a clean $C_3$-$C_6$ mixed-alcohol stream;

(f) feeding the $C_3$-$C_6$ mixed-alcohol stream or, if step (e) is conducted, the clean $C_3$-$C_6$ mixed-alcohol stream to a dehydration reactor operated at effective alcohol-dehydration conditions and in the presence of a dehydration catalyst, to catalytically convert at least a portion of the $C_3$-$C_6$ mixed alcohols to $C_3$-$C_6$ mixed olefins;

(g) feeding the $C_3$-$C_6$ mixed olefins to an oligomerization reactor operated at effective oligomerization conditions and in the presence of an oligomerization catalyst, to catalytically convert at least a portion of the $C_3$-$C_6$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel, which preferably meets all specifications under ASTM D7566-24a.

Certain variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_3$-$C_4$ mixed-alcohol stream and a reactor off-gas;

(e) optionally, purifying the $C_3$-$C_4$ mixed-alcohol stream to generate a clean $C_3$-$C_4$ mixed-alcohol stream;

(f) feeding the $C_3$-$C_4$ mixed-alcohol stream or, if step (e) is conducted, the clean $C_3$-$C_4$ mixed-alcohol stream to a dehydration reactor operated at effective alcohol-dehydration conditions and in the presence of a dehydration catalyst, to catalytically convert at least a portion of the $C_3$-$C_4$ mixed alcohols to $C_2$-$C_4$ mixed olefins;

(g) feeding the $C_2$-$C_4$ mixed olefins to an oligomerization reactor operated at effective oligomerization conditions and in the presence of an oligomerization catalyst, to catalytically convert at least a portion of the $C_2$-$C_4$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel, which preferably meets all specifications under ASTM D7566-24a.

Other variations provide aviation fuel produced by a process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, including alcohol recycle back to the alcohol-synthesis reactor, and in the presence of an alcohol-synthesis catalyst, to catalytically convert at least a portion of the $H_2$ and the CO to a $C_6$-$C_{16}$ mixed-alcohol stream and a reactor off-gas;

(e) optionally, purifying the $C_6$-$C_{16}$ mixed-alcohol stream to generate a clean $C_6$-$C_{16}$ mixed-alcohol stream;

(f) feeding the $C_6$-$C_{16}$ mixed-alcohol stream or, if step (e) is conducted, the clean $C_6$-$C_{16}$ mixed-alcohol stream to a dehydration reactor operated at effective alcohol-dehydration conditions and in the presence of a dehydration catalyst, to catalytically convert at least a portion of the $C_6$-$C_{16}$ mixed alcohols to $C_6$-$C_{16}$ mixed olefins;

(g) optionally, feeding the $C_6$-$C_{16}$ mixed olefins to an oligomerization reactor operated at effective oligomerization conditions and in the presence of an oligomerization catalyst, to catalytically convert at least a portion of the $C_6$-$C_{16}$ mixed olefins to a hydrocarbon stream comprising $C_6$-$C_{16}$ mixed hydrocarbons;

(h) optionally, separating and removing light or heavy hydrocarbons that are not within the $C_6$-$C_{16}$ range, from the hydrocarbon stream;

(i) feeding hydrogen and the $C_6$-$C_{16}$ mixed olefins or, if step (g) is conducted, the $C_6$-$C_{16}$ mixed hydrocarbons to a hydrogenation reactor operated at effective hydrogenation conditions and in the presence of a hydrogenation catalyst, to catalytically hydrogenate at least some C=C double bonds within the $C_6$-$C_{16}$ mixed olefins or, of step (g) is conducted, within the $C_6$-$C_{16}$ mixed hydrocarbons, thereby generating stabilized $C_6$-$C_{16}$ mixed hydrocarbons; and (j) recovering the stabilized $C_6$-$C_{16}$ mixed hydrocarbons as aviation fuel, which preferably meets all specifications under ASTM D7566-24a.

Still other variations provide a system configured to carry out a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_1$-$C_{10}$ mixed-alcohol stream and a reactor off-gas;

(e) optionally, purifying the $C_1$-$C_{10}$ mixed-alcohol stream to generate a clean $C_1$-$C_{10}$ mixed-alcohol stream;

(f) feeding the $C_1$-$C_{10}$ mixed-alcohol stream or, if step (e) is conducted, the clean $C_1$-$C_{10}$ mixed-alcohol stream to a dehydration reactor operated at effective alcohol-dehydration conditions and in the presence of a dehydration catalyst, to catalytically convert at least a portion of the $C_1$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Other variations provide a system configured to carry out a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_2$-$C_{10}$ mixed-alcohol stream and a reactor off-gas;

(e) optionally, purifying the $C_2$-$C_{10}$ mixed-alcohol stream to generate a clean $C_2$-$C_{10}$ mixed-alcohol stream;

(f) feeding the $C_2$-$C_{10}$ mixed-alcohol stream or, if step (e) is conducted, the clean $C_2$-$C_{10}$ mixed-alcohol stream to a dehydration reactor operated at effective alcohol-dehydration conditions and in the presence of a dehydration catalyst, to catalytically convert at least a portion of the $C_2$-$C_{10}$ mixed alcohols to $C_2$-$C_{10}$ mixed olefins;

(g) feeding the $C_2$-$C_{10}$ mixed olefins to an oligomerization reactor operated at effective oligomerization conditions and in the presence of an oligomerization catalyst, to catalytically convert at least a portion of the $C_2$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Other variations provide a system configured to carry out a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_{10}$ mixed-alcohol stream and a reactor off-gas;

(e) optionally, purifying the $C_3$-$C_{10}$ mixed-alcohol stream to generate a clean $C_3$-$C_{10}$ mixed-alcohol stream;

(f) feeding the $C_3$-$C_{10}$ mixed-alcohol stream or, if step (e) is conducted, the clean $C_3$-$C_{10}$ mixed-alcohol stream to a dehydration reactor operated at effective alcohol-dehydration conditions and in the presence of a dehydration catalyst, to catalytically convert at least a portion of the $C_3$-$C_{10}$ mixed alcohols to $C_3$-$C_{10}$ mixed olefins;

(g) feeding the $C_3$-$C_{10}$ mixed olefins to an oligomerization reactor operated at effective oligomerization conditions and in the presence of an oligomerization catalyst, to catalytically convert at least a portion of the $C_3$-$C_{10}$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Other variations provide a system configured to carry out a process for producing aviation fuel from syngas, the process comprising:

(a) providing a starting syngas stream comprising $H_2$ and CO;

(b) purifying the syngas feed stream to generate a clean syngas stream;

(c) optionally, adjusting the $H_2$/CO ratio of the starting syngas stream or the clean syngas stream;

(d) feeding the clean syngas stream to an alcohol-synthesis reactor operated at effective alcohol-synthesis conditions, optionally including alcohol recycle back to the alcohol-synthesis reactor, and in the presence of an alcohol-synthesis catalyst, to catalytically convert at least a portion of the $H_2$ and the CO to a $C_3$-$C_6$ mixed-alcohol stream and a reactor off-gas;

(e) optionally, purifying the $C_3$-$C_6$ mixed-alcohol stream to generate a clean $C_3$-$C_6$ mixed-alcohol stream;

(f) feeding the $C_3$-$C_6$ mixed-alcohol stream or, if step (e) is conducted, the clean $C_3$-$C_6$ mixed-alcohol stream to a dehydration reactor operated at effective alcohol-dehydration conditions and in the presence of a dehydration catalyst, to catalytically convert at least a portion of the $C_3$-$C_6$ mixed alcohols to $C_3$-$C_6$ mixed olefins;

(g) feeding the $C_3$-$C_6$ mixed olefins to an oligomerization reactor operated at effective oligomerization conditions and in the presence of an oligomerization catalyst, to catalytically convert at least a portion of the $C_3$-$C_6$ mixed olefins to a hydrocarbon stream comprising $C_5$-$C_{16}$ mixed hydrocarbons;

(h) optionally, separating and removing light or heavy hydrocarbons that are not within the $C_5$-$C_{16}$ range, from the hydrocarbon stream;

(i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and (j) recovering the stabilized $C_5$-$C_{16}$ mixed hydrocarbons as aviation fuel.

Certain variations provide a system configured to carry out a process for producing aviation fuel from syngas, the process comprising:
- (a) providing a starting syngas stream comprising $H_2$ and CO;
- (b) purifying the syngas feed stream to generate a clean syngas stream;
- (c) optionally, adjusting the $H_2$/CO ratio of the starting syngas stream or the clean syngas stream;
- (d) feeding the clean syngas stream to an alcohol-synthesis reactor operated at effective alcohol-synthesis conditions and in the presence of an alcohol-synthesis catalyst, to catalytically convert at least a portion of the $H_2$ and the CO to a $C_3$-$C_4$ mixed-alcohol stream and a reactor off-gas;
- (e) optionally, purifying the $C_3$-$C_4$ mixed-alcohol stream to generate a clean $C_3$-$C_4$ mixed-alcohol stream;
- (f) feeding the $C_3$-$C_4$ mixed-alcohol stream or, if step (e) is conducted, the clean $C_3$-$C_4$ mixed-alcohol stream to a dehydration reactor operated at effective alcohol-dehydration conditions and in the presence of a dehydration catalyst, to catalytically convert at least a portion of the $C_3$-$C_4$ mixed alcohols to $C_2$-$C_4$ mixed olefins;
- (g) feeding the $C_2$-$C_4$ mixed olefins to an oligomerization reactor operated at effective oligomerization conditions and in the presence of an oligomerization catalyst, to catalytically convert at least a portion of the $C_2$-$C_4$ mixed olefins to a hydrocarbon stream comprising $C_5$-$C_{16}$ mixed hydrocarbons;
- (h) optionally, separating and removing light or heavy hydrocarbons that are not within the $C_5$-$C_{16}$ range, from the hydrocarbon stream;
- (i) feeding the $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within the $C_5$-$C_{16}$ mixed hydrocarbons, thereby generating stabilized $C_5$-$C_{16}$ mixed hydrocarbons; and
- (j) recovering the stabilized $C_5$-$C_{16}$ mixed hydrocarbons as aviation fuel.

Other variations provide a system configured to carry out a process for producing aviation fuel from syngas, the process comprising:
- (a) providing a starting syngas stream comprising $H_2$ and CO;
- (b) purifying the syngas feed stream to generate a clean syngas stream;
- (c) optionally, adjusting the $H_2$/CO ratio of the starting syngas stream or the clean syngas stream;
- (d) feeding the clean syngas stream to an alcohol-synthesis reactor operated at effective alcohol-synthesis conditions, including alcohol recycle back to the alcohol-synthesis reactor, and in the presence of an alcohol-synthesis catalyst, to catalytically convert at least a portion of the $H_2$ and the CO to a $C_6$-$C_{16}$ mixed-alcohol stream and a reactor off-gas;
- (e) optionally, purifying the $C_6$-$C_{16}$ mixed-alcohol stream to generate a clean $C_6$-$C_{16}$ mixed-alcohol stream;
- (f) feeding the $C_6$-$C_{16}$ mixed-alcohol stream or, if step (e) is conducted, the clean $C_6$-$C_{16}$ mixed-alcohol stream to a dehydration reactor operated at effective alcohol-dehydration conditions and in the presence of a dehydration catalyst, to catalytically convert at least a portion of the $C_6$-$C_{16}$ mixed alcohols to $C_6$-$C_{16}$ mixed olefins;
- (g) optionally, feeding the $C_6$-$C_{16}$ mixed olefins to an oligomerization reactor operated at effective oligomerization conditions and in the presence of an oligomerization catalyst, to catalytically convert at least a portion of the $C_6$-$C_{16}$ mixed olefins to a hydrocarbon stream comprising $C_6$-$C_{16}$ mixed hydrocarbons;
- (h) optionally, separating and removing light or heavy hydrocarbons that are not within the $C_6$-$C_{16}$ range, from the hydrocarbon stream;
- (i) feeding hydrogen and the $C_6$-$C_{16}$ mixed olefins or, if step (g) is conducted, the $C_6$-$C_{16}$ mixed hydrocarbons to a hydrogenation reactor operated at effective hydrogenation conditions and in the presence of a hydrogenation catalyst, to catalytically hydrogenate at least some C=C double bonds within the $C_6$-$C_{16}$ mixed olefins or, of step (g) is conducted, within the $C_6$-$C_{16}$ mixed hydrocarbons, thereby generating stabilized $C_6$-$C_{16}$ mixed hydrocarbons; and
- (j) recovering the stabilized $C_6$-$C_{16}$ mixed hydrocarbons as aviation fuel.

Each reactor employed herein may be a single physical vessel, or multiple vessels operating in series or in parallel (or both). For example, the alcohol-synthesis reactor may be configured with a large number of individual reactor tubes holding catalyst; each reactor tube may be considered a distinct reactor. As another example, the alcohol-synthesis reactor may be a single vessel containing catalyst and incorporating internal cooling tubes. The internal cooling tubes may contain water that converts to steam, thereby cooling the alcohol-synthesis reaction side while generating steam that may be utilized elsewhere in the process. The internal cooling tubes may alternatively contain syngas reactor feed that is preheated, thereby cooling the alcohol-synthesis reaction side while generating heated syngas that is fed to the reactor entrance. As another example, the oligomerization reactor may be split into multiple sequential reactor zones, potentially containing different catalysts and operating at different temperatures and/or residence times, to optimize initial oligomerization relative to final oligomerization. Also, multiple reactors may actually be reaction zones contained within a single reaction vessel. For example, there may be a dehydration reaction zone, followed by a oligomerization reaction zone, followed by a hydrogenation reaction zone, all physically contained in a single vessel.

The mode of operation for the process and system may be continuous, semi-continuous, batch, or any combination or variation of these. In preferred embodiments, continuous or semi-continuous operation is employed.

Some embodiments will now be further described in reference to syngas derived from certain sources (e.g., biogas), it being understood that the presently disclosed technology is by no means limited to these sources.

Currently, syngas is produced in the United States primarily through steam methane reforming (SMR) technology, and primarily from fossil natural gas found in natural gas fields, oil well fields, or coal beds. The produced syngas is used for production of chemicals, fuel additives, or fertilizers. The produced syngas may also be water-gas shifted for increased hydrogen production, with that hydrogen often being used in the production of high-carbon-intensity gasoline.

Steam reforming of natural gas is the largest global source of hydrogen. The production of hydrogen is very important industrially, since hydrogen is required for many essential chemical processes. Hydrogen is used in the industrial synthesis of ammonia via the Haber process, for example.

Other uses of hydrogen include oil refining (e.g., hydrotreating or hydrodesulfurization), methanol production, transportation fuels, and hydrogen fuel cells, to name a few.

Conventional steam methane reforming mixes natural gas and steam and uses an external source of hot gas to heat SMR tubes in which an endothermic catalytic reaction takes place. The steam reacts directly with methane, commonly using a nickel-based catalyst, to produce a gas stream of carbon monoxide (CO), hydrogen ($H_2$), carbon dioxide ($CO_2$), and small amounts of unconverted methane ($CH_4$) as well as any nitrogen ($N_2$) that entered with the feed gas. The produced gas stream is referred to as synthesis gas or syngas.

Other methane-to-syngas conversion processes utilize partial oxidation or autothermal reforming. In partial oxidation (POX), a catalyst is utilized to partially oxidize methane with oxygen (pure $O_2$ or air) to generate syngas. Because it is exothermic, catalytic partial oxidation is less energy-intensive than endothermic steam-methane reforming. Autothermal reforming (ATR) uses oxygen and carbon dioxide or steam in a reaction with methane to form syngas. The reaction usually takes place in a single chamber where the methane is partially oxidized in an exothermic process. The main difference between autothermal reforming and steam-methane reforming is that steam-methane reforming does not require oxygen. Autothermal reforming can be regarded as a hybrid of steam-methane reforming and partial oxidation, in which $H_2$/CO ratios can be readily varied by adjusting the $H_2O$ and $CO_2$ concentrations in the feed gas. Methane dry reforming is an alternative process for producing syngas by reacting $CH_4$ with $CO_2$ in a highly endothermic catalyzed reaction at high temperatures. This process is not widely used in the gas-processing industries because of rapid catalyst deactivation due to carbon deposition.

The following reactions take place in steam reforming of methane:

$$CH_4 + H_2O \text{ (steam)} \rightarrow CO + 3\,H_2 \text{ (Endothermic)}$$

$$CO + H_2O \text{ (steam)} \rightarrow CO_2 + H_2 \text{ (Exothermic)}$$

where the first reaction is the primary reaction of methane with water to form one molecule of CO and three molecules of $H_2$, and the second reaction is the water-gas shift reaction that converts a molecule of CO (from the primary reaction) into $CO_2$ by removing an oxygen atom from water to make more hydrogen. In industrial practice, there may be a separate water-gas shift reactor downstream of the steam methane reformer.

Renewable natural gas derived from biogas enables a syngas producer to control the carbon intensity of the syngas, which in turn significantly impacts the carbon intensity of the final aviation fuel made from that syngas. In particular, some embodiments, provide an integrated process to convert biogas (such as anaerobic digester gas, animal waste gas, or landfill gas) into SAF. This may be accomplished, for example, by first cleaning up the biogas to produce renewable natural gas (RNG) and then using that RNG as a partial or complete feedstock to a syngas generator (e.g., SMR, ATR, or POX units). The use of RNG significantly lowers the carbon intensity (CI) of the produced syngas, for multiple reasons including the avoidance of methane that would otherwise be emitted to the atmosphere (methane is a potent greenhouse gas). When mixed alcohols are produced from the syngas, the carbon intensity of the mixed-alcohol product can be very low or even negative. Consequently, when aviation fuel is produced from the mixed alcohols, the carbon intensity of the aviation fuel can be very low, including at least 50% reduction of GHG emissions compared to conventional aviation fuel, which means the aviation fuel qualifies as SAF.

In some variations, biogas is produced from landfill recovery or anaerobic digestion of animal waste. Biogas typically contains 55-65 vol % methane, 30-45 vol % $CO_2$, and 0.1-3 vol % $H_2S$. Due to the high $CO_2$ content, the presence of $H_2S$, and the low BTU (energy) value, the biogas is preferably upgraded to typical pipeline specifications of natural gas. Upgrading of the biogas may be accomplished by water or chemical scrubbing or the use of specialty membranes to remove the $CO_2$, and then absorption of the $H_2S$, followed by drying of the gas to remove retained water. Once the biogas has been upgraded to pipeline specifications, the biogas is considered to be "renewable natural gas" (RNG).

In some embodiments, biogas purification may include a step of catalytically removing oxygen from the biogas, such as with a $Al_2O_3$—$TiO_2$ catalyst. In an exemplary process, the biogas flows through an economizer where it is preheated by the hot outgoing gas exiting the catalyst bed. The biogas may be further heated using an electric heater. The biogas then passes through the $Al_2O_3$—$TiO_2$ catalyst bed where any remaining $O_2$ is converted into carbon dioxide and water vapor. The biogas may be passed back through the economizer where it pre-cooled, before being further cooled by air-cooled and/or water-cooled heat exchangers. Any condensed moisture may be removed in a separator, while water vapor may be removed using a temperature-swing-adsorption dryer.

The RNG may be fed to a syngas generator directly. Alternatively, or additionally, the RNG may be transferred to a commercial natural gas pipeline system where it is co-mingled with fossil natural gas. A user then removes gas from the pipeline just as the user does fossil natural gas and uses the pipeline gas as a feed to a syngas generator. The syngas generator produces a mixture of hydrogen ($H_2$), carbon monoxide (CO), and carbon dioxide ($CO_2$), with small amounts of methane ($CH_4$) and nitrogen ($N_2$). This syngas mixture is preferably processed through a gas separation system—typically an amine system or membranes—to remove $CO_2$, $CH_4$, and $N_2$ as well as any excess $H_2$. The recovered $CO_2$ may be used for enhanced oil recovery or may be sequestered in a geological formation. The excess $H_2$ may be used in the process (e.g., in olefin hydrogenation) or sold, and the nitrogen may be vented to atmosphere.

The remaining cleaned syngas ($H_2$ and CO) may be then further compressed and sent to a mixed-alcohol reactor unit, in which the CO and $H_2$ are heated and passed over a catalyst so that a portion of the syngas is converted to mixed alcohols. The unreacted syngas, along with small quantities of $CO_2$ and $CH_4$, may be blended back into the fresh syngas for separation along with the incoming syngas gas from the syngas generator.

Some variations utilize a process for producing mixed alcohols, the process comprising:
(a) obtaining a biogas feedstock;
(b) purifying the biogas feedstock to generate a renewable natural gas stream comprising methane;
(c) introducing the renewable natural gas stream into a methane-to-syngas unit operated at effective conditions to convert the methane to a first syngas stream containing at least $H_2$, CO, and $CO_2$;
(d) purifying the first syngas stream, including separating the $CO_2$ from the first syngas stream, and optionally separating some of the $H_2$ from the first syngas stream, thereby generating a clean syngas stream;

(e) introducing the clean syngas stream into a mixed-alcohol reactor operated at effective alcohol synthesis conditions and in the presence of an alcohol-synthesis catalyst, thereby generating mixed alcohols and a reactor off-gas; and (f) optionally purifying the mixed alcohols to generate a mixed-alcohol product.

The mixed-alcohol product may be utilized to make SAF according to the disclosed technology. For example, the mixed-alcohol product may be the $C_1$-$C_{10}$ mixed-alcohol stream fed to the dehydration reactor. Optionally, a portion of the mixed-alcohol product may be sold or used for other purposes, besides production of aviation fuel.

Various syngas sources will be further described, without limiting the scope of the present invention.

In some embodiments, a biogas feedstock is obtained from a source selected from the group consisting of a landfill, an industrial compost facility, an anaerobic digestor, and combinations thereof. In certain embodiments, an anaerobic digestor is configured for anaerobic digestion of animal waste.

The composition of the biogas feedstock usually varies from different sources. As one example, landfill gas often has somewhat higher $CO_2$ content and somewhat lower $CH_4$ content compared to animal gas. When biogas is utilized, the processes disclosed herein may be adjusted to account for the composition of the starting biogas feedstock.

Generally speaking, biogas may be recovered from an anaerobic digestor that digests biodegradable material, a landfill, an industrial compost facility, a wastewater treatment plant, or a biorefinery that co-produces biogas from biomass.

Landfill gas (LFG), also referred to as landfill biogas, is a natural byproduct of the decomposition of organic material in landfills. Instead of escaping into the air, LFG can be captured, converted, and used as a renewable energy resource. LFG may be collected through vertical and horizontal piping buried in a landfill. Using LFG helps to reduce odors and other hazards associated with LFG emissions, and prevents methane from migrating into the atmosphere.

Municipal solid waste (MSW) landfills are the third-largest source of human-related methane emissions in the United States. At the same time, methane emissions from MSW landfills represent a lost opportunity to capture and use a significant energy resource.

When MSW is first deposited in a landfill, it undergoes an aerobic (with oxygen) decomposition stage when little methane is generated. Then, typically within less than 1 year, anaerobic conditions are established and methane-producing bacteria begin to decompose the waste and generate methane. Bacteria usually decompose landfill waste in four phases. Gas composition changes with each phase, and waste in a landfill may be undergoing several phases of decomposition at once. The methane content may therefore vary depending on the decomposition phase when the LFG is collected. LFG may be extracted from landfills using a series of wells and a blower/flare (or vacuum) system. This system directs the collected gas to a central point where it can be processed and upgraded to RNG as disclosed herein.

When biogas is recovered from an anaerobic digestor, the process uses anaerobic digestion—a series of biological processes in which microorganisms break down biodegradable material in the absence of oxygen. One of the end products is biogas. Known anaerobic digestion technologies can convert livestock manure, municipal wastewater solids, food waste, industrial wastewater residuals, fats, oils, grease, and various other organic waste streams into biogas. Separated digested solids can be composted, utilized for animal bedding, directly applied to cropland, or converted into other products. Nutrients in the liquid stream may be used in agriculture as fertilizer. Digestate can also be converted into fuel pellets for industrial use.

The conventional digestion process begins with bacterial hydrolysis of the input materials in order to break down insoluble organic polymers such as carbohydrates and make them available for other bacteria. Acidogenic bacteria then convert the sugars and amino acids into carbon dioxide, hydrogen, ammonia, and organic acids. Acetogenic bacteria convert the organic acids into acetic acid, along with additional ammonia, hydrogen, and carbon dioxide. Finally, methanogens convert these products to methane and carbon dioxide.

Anaerobic digestion may convert a lignocellulosic feedstock to methane. A lignocellulosic feedstock contains at least cellulose and typically contains lignin. Anaerobic digestion can accommodate a wide range of feedstocks of various types, sizes, and moisture contents. For example, biomass such as agricultural wastes, forest products, grasses, and other cellulosic material may be used. In various embodiments, the lignocellulosic feedstock includes one or more materials selected from grass straw, corn stover, wheat straw, rice straw, cotton burr, sugarcane bagasse, switchgrass, *miscanthus*, animal manure, municipal garbage, municipal sewage, commercial waste, grape pumice, almond shells, pecan shells, coconut shells, coffee grounds, grass pellets, hay pellets, wood pellets, timber harvesting residues, softwood chips, hardwood chips, tree branches, tree stumps, leaves, bark, sawdust, paper, cardboard, or off-spec paper pulp. A person of ordinary skill in the art will appreciate that the feedstock options are virtually unlimited. The feedstock may be milled using known apparatus, such as hammer mills, duplex mills, shredders, Valley beaters, disk refiners, conical refiners, or cylindrical refiners, for example.

Anaerobic digestion may utilize a waste feedstock, such as food waste, agricultural organic waste, industrial organic waste, livestock manure, or a combination thereof, for example. A waste feedstock may or may not contain cellulose and/or lignin. Cow manure, for example, contains cellulose and lignin that is not digested. Certain food wastes may contain high amounts of oils and/or starches but contain substantially no cellulose or lignin.

Anaerobic digesters can be designed and engineered to operate using a number of different configurations and can be categorized into batch vs. continuous process mode, mesophilic vs. thermophilic temperature conditions, high solids vs. low solids, and single stage vs. multistage processes.

In a batch system, feedstock is added to the reactor (anaerobic digester) at the start of the process. The reactor is then sealed for the duration of the process. In its simplest form, batch processing utilizes inoculation with already processed material to start the anaerobic digestion. In continuous digestion processes, organic matter is constantly added or is added at multiple times to the reactor. Examples of this form of anaerobic digestion include continuous stirred-tank reactors, upflow anaerobic sludge blankets, expanded granular sludge beds, and internal circulation reactors. Fed-batch anaerobic digestion is also possible, in which feedstock is continuously fed but product biogas is not removed until the end of the batch process. An anerobic digestor may also be designed and operated continuously.

Anaerobic digesters essentially carry out fermentation to ultimately produce $CH_4$ and $CO_2$. Fermentation conditions in the anaerobic digesters are conditions that generate at least some methane-containing biogas from the input material. The fermentation temperature may be selected from about 20° C. to about 70° C., for example. The fermentation temperatures for anaerobic digesters are preferably selected based on the species of methanogens (or other microorganisms) in the digesters. Mesophilic digestion takes place at temperatures from about 20° C. to about 45° C., when mesophilic microorganisms are present. Thermophilic digestion takes place from about 50° C. to about 70° C., when thermophilic microorganisms are present.

Thermophilic temperatures enhance the disintegration and gas production from the feedstock. Microorganisms are typically bacteria but may be yeasts. Exemplary microorganisms include, but are not limited to, *Clostridium, Pseudomonas, Eubacterium, Methanaosarcina, Methanosaeta*, and *Methanobacterium* species.

The fermentation residence time in an anerobic digester varies with the amount and type of feed material and with the reactor configuration. The fermentation time may be selected from about 5 days to about 60 days, for example. In a typical two-stage mesophilic digestion, residence time varies between about 10 to 60 days, while for a single-stage thermophilic digestion, residence times is normally faster such as about 5 to 40 days. The fermentation pH may be selected from about 6.5 to about 8.5, for example.

This specification hereby incorporates by reference Taricska et al., "Anaerobic Digestion" In: *Biosolids Treatment Processes. Handbook of Environmental Engineering*, Vol 6. Humana Press, 2007 for its teachings of the design and operation of anaerobic digesters, in some embodiments.

A purification step is preferably included in the process to purify the biogas, although the necessity of that step will depend on the source of the biogas and its quality. In some embodiments, a purification step utilizes water scrubbing, chemical scrubbing, or a combination thereof to remove at least some carbon dioxide from the biogas feedstock. In these or other embodiments, a purification step may utilize a membrane to remove at least some carbon dioxide from the biogas feedstock.

In some embodiments in which the biogas feedstock contains $H_2S$, a purification step may utilize absorption of the $H_2S$ into an absorption media (e.g., amines) to remove at least some of the $H_2S$ from the biogas feedstock. Caustic wash, iron oxide, and biological processes are commonly used for $H_2S$ removal in biogas.

In some embodiments, a purification step utilizes drying to remove at least some water from the biogas feedstock. This step may be omitted, for example, when the biogas is being fed to a SMR unit, in some embodiments.

The methane-to-syngas unit may be selected from the group consisting of a steam reforming reactor, an autothermal reforming reactor, a partial-oxidation reactor, and combinations thereof.

In some embodiments, a pipeline natural gas stream is co-fed, along with the renewable natural gas stream, to the methane-to-syngas unit. Various fractions of renewable natural gas may be fed to the methane-to-syngas unit. In various embodiments, the percentage of renewable natural gas fed, relative to total natural gas, may be about, at least about, or at most about 1%, 2%, 5%, 10%, 15%, 20%, 25%, 30%, 35%, 40%, 45%, 50%, 55%, 60%, 65%, 70%, 75%, 80%, 85%, 90%, 95%, 99%, or 100%, including all intervening ranges.

It is possible to combine the renewable natural gas with another source of natural gas that is not necessarily from a pipeline or even pipeline-quality gas. For example, renewable natural gas may be combined with a refinery off-gas, or with a methane co-product of a chemical plant, for example.

A syngas purification unit may comprise one or more individual unit operations. Syngas purification may utilize an amine-based unit, a cryogenic unit, a membrane-separation unit, a pressure-swing adsorption unit, or a combination thereof. When syngas purification utilizes multiple units, those multiple units are all contained within the syngas purification unit, in series, in parallel, or a combination thereof. In some embodiments, an amine-based unit is followed by a membrane unit. In other embodiments, a membrane unit is followed by an amine-based unit.

Amine-based units are known for removing $CO_2$ and $H_2S$ from gas streams. In such systems, the amine functions as a solvent to dissolve $CO_2$, which is later removed by adjusting conditions such as temperature. Any amine may be utilized as the solvent, such as diethanolamine (DEA), monoethanolamine (MEA), methyldiethanolamine (MDEA), diisopropanolamine (DIPA), or aminoethoxyethanol (DGA). Water washing is commonly used to remove $CO_2$ in biogas cleanup systems.

In some embodiments, methanol is used as a solvent to remove both $CO_2$ and $H_2S$ from a gas stream, such as a starting syngas stream, or a reactor recycle stream. The methanol for this purpose may be obtained from separation of $C_1$-$C_{10}$ mixed alcohols produced via alcohol synthesis, for example.

Cryogenic separation (or cryogenic distillation) may be used for the separation of $CH_4$, $CO_2$, $N_2$, and/or other components, from a syngas stream. Components of the syngas are separated using differences in their boiling points. The syngas may be pretreated to remove any impurities that would freeze at cryogenic temperatures, primarily water and carbon dioxide, and methane at cold enough temperatures.

In certain embodiments, syngas purification employs a combination of an amine-based unit (referred to also as an amine system) and a cryogenic unit (referred to also as a cold box), in sequential unit operations to collectively remove $CO_2$, $CH_4$, $N_2$, and optionally $H_2$. It is important, in these embodiments, that the amine system is upstream of the cold box so that high amounts of $CO_2$ do not enter the cold box and potentially cause $CO_2$ freezing and plugging (a problem known as $CO_2$ freeze-out). In exemplary embodiments, a cryogenic separation unit is operated at a cold-box temperature of about −173° C. and a cold-box pressure of about 50 bar. At a pressure of 50 bar, methane can be separated at approximately −100° C., and nitrogen can be separated at approximately −150° C., for example.

Membrane-separation units utilize one or more membranes which enable separation via permeability differences of syngas components. Membranes may be fabricated from polymers, ceramics, and/or zeolites, for example. A multi-stage membrane design may be utilized to separate multiple components, such as $CH_4$, $CO_2$, and $N_2$ out of a $H_2/CO$ stream.

Pressure-swing adsorption (PSA) may be utilized in syngas purification. Pressure-swing adsorption processes are commonly utilized for the production of high-purity hydrogen. Pressure-swing adsorption separates gas species from a mixture of gases under pressure according to differences in species affinities for an adsorbent material. Specific adsorbent materials (e.g., zeolites, activated carbon, silica gel, etc.) are used as a trap, preferentially adsorbing the target gas species at high pressure. The process then swings to low pressure to desorb the adsorbed species. A PSA unit is desirable when a $H_2$-rich stream is desired from the syngas purification unit. Preferably, the pressure-swing adsorption unit (when present) is downstream of both the amine-based unit and the cryogenic unit.

In some embodiments, the $CO_2$-rich stream is compressed and used in enhanced oil recovery. In these or other embodiments, the $CO_2$-rich stream is sequestered in a geological formation. When the $CO_2$-rich stream is geologically sequestered, the environmental footprint is improved because there is a net reduction in greenhouse gas potential due to reduced $CO_2$ content in the atmosphere. Enhanced oil recovery or sequestration into a geological formation removes a quantity of $CO_2$ from the atmosphere. Exemplary geological formations include underground caverns or geological storage horizons, where the $CO_2$ gas can be permanently stored. In some embodiments, underground caverns or geological storage horizons are contained in active or abandoned oil or natural gas fields. In certain embodiments, the $CO_2$ gas is injected unto an active oil or natural gas field and serves to increase production of oil or natural gas, where the $CO_2$ gas substantially remains sequestered in that oil or natural gas field during and after production. The separated $CO_2$ may be use in other ways, such as dry ice production or wastewater treatment. In certain embodiments, the $CO_2$ is further purified and sold for applications that require relatively high $CO_2$ purity, such as food-grade carbon dioxide or medical-grade dry ice, for example.

In some embodiments, the $CO_2$-rich stream is utilized to produce CO via the reverse water-gas shift reaction ($CO_2$+ $H_2 \rightarrow CO+H_2O$) in the presence of a suitable catalyst, such as platinum supported on titanium dioxide, or copper dispersed on molybdenum carbide.

In some embodiments, in syngas purification, at least some of the $H_2$ is separated and recovered from the first syngas stream, into a hydrogen-rich stream. At least some of this $H_2$ may be used as fuel within the process, such as to heat the methane-to-syngas unit, especially when the methane-to-syngas unit is net-endothermic (e.g., in a steam-reforming reactor). Alternatively, or additionally, at least some of the $H_2$ is recovered as a motor fuel. Alternatively, or additionally, at least some of the $H_2$ is recovered and utilized in an oil and gas refinery, which lowers the carbon intensity of gasoline, diesel fuel, jet fuel, or other refinery products. In particular embodiments, at least some of the $H_2$ is recovered and utilized in the hydrogenation reactor for olefin stabilization.

In some embodiments, in syngas purification, a methane-rich stream is separated from the first syngas stream. The methane-rich stream may be recycled to the methane-to-syngas unit. Alternatively, or additionally, the methane-rich stream may be combusted to provide heat to the methane-to-syngas unit. The methane-rich stream may be utilized as a fuel for a boiler or process heater. Alternatively, or additionally, the $CH_4$-rich stream may be utilized as a fuel for the methane-to-syngas unit, especially when the methane-to-syngas unit is net-endothermic (e.g., in a steam-reforming reactor).

In some embodiments, syngas purification generates a $N_2$ stream that may be released to the atmosphere. In principle, the $N_2$ may be recovered and sold. The $N_2$ may be utilized in the Haber process for ammonia synthesis by reacting the $N_2$ with $H_2$ (e.g., the $H_2$-rich stream) to produce $NH_3$.

In some embodiments, in syngas purification, nitrogen is separated from the first syngas stream. The nitrogen may be purged from the process and released to the atmosphere or recovered for other uses, such as production of a liquid nitrogen co-product. The $N_2$ may be utilized in the Haber process for ammonia synthesis by reacting the $N_2$ with $H_2$ (e.g., the $H_2$-rich stream) to produce $NH_3$.

A "carbon intensity" (or "CI") of aviation fuel in this specification means the amount by weight of carbon dioxide, and greenhouse-gas equivalents of carbon dioxide, emitted per unit of energy contained in the fuel under consideration. The typical units of carbon intensity are grams carbon dioxide equivalent per megajoules of energy, or g $CO_2$e/MJ.

A greenhouse gas (or "GHG") is any gas in the atmosphere which absorbs and re-emits heat, and thereby keeps the planet's atmosphere warmer than it otherwise would be. The main GHGs in the Earth's atmosphere are water vapor, carbon dioxide, methane, nitrous oxide, and ozone. GHGs occur naturally in the Earth's atmosphere, but human activities, such as the burning of fossil fuels, are increasing the atmospheric levels of GHGs, causing at least some amount of global warming. Burning of fossil fuels is well-known to generate massive quantities of $CO_2$. By convention, the global-warming potential of $CO_2$ is defined to be 1. The global-warming potential of $CH_4$ is about 25, i.e., methane is 25× more potent than $CO_2$ as a greenhouse gas. See "IPCC Fourth Assessment Report: Climate Change 2007", Intergovernmental Panel on Climate Change, Cambridge University Press, Cambridge (2007), which is hereby incorporated by reference herein.

In order to calculate the carbon intensity of mixed alcohols or an aviation fuel as disclosed herein, the carbon intensities of the starting syngas need to be estimated, as do the carbon intensities associated with the all process steps. One skilled in the art of chemical engineering is able to make these calculations. An important factor is the source of the syngas. For example, animal biogas and landfill gas are normally released to the atmosphere which is problematic due to the global-warming potential of 25 for $CH_4$. By instead capturing and converting that $CH_4$ to syngas, the carbon intensity is greatly decreased. Life-cycle analysis may be employed to determine the carbon intensity associated with the starting syngas.

Significant environmental advantages result from producing biogas from landfills, anaerobic digestion of animal waste, or other sources, and utilizing clean-up technologies to produce renewable natural gas or otherwise acquiring (e.g., purchasing) renewable natural gas for the production of syngas, converting that syngas to mixed alcohols, and then converting the mixed alcohols to aviation fuel.

Aviation fuel made from syngas as disclosed herein can be shown to contain renewable carbon (i.e., carbon that is derived from renewable sources such as biogas or biomass, rather than from non-renewable fossil sources). This can be shown from a measurement of the $^{14}C/^{12}C$ isotopic ratio of the carbon in a sample of the aviation fuel. When the aviation fuel is burned for energy to power the aircraft, $CO_2$ returns to the environment to be taken up by growing biomass via photosynthesis. In this way, net $CO_2$ emissions are significantly reduced.

A similar concept may be applied to hydrogen, in which the 2H/1H isotopic ratio is measured ($^2$H is also known as deuterium, D). Fossil sources tend to be depleted in deuterium compared to biomass. See Schiegl et al., "Deuterium content of organic matter", *Earth and Planetary Science Letters*, Volume 7, Issue 4, 1970, Pages 307-313; and Hayes, "Fractionation of the Isotopes of Carbon and Hydrogen in Biosynthetic Processes", Mineralogical Society of America, National Meeting of the Geological Society of America, Boston, MA, 2001, which are hereby incorporated by reference herein.

As will be appreciated by a skilled engineer, the processes and systems of the invention may employ various process sensors and control schemes to monitor and control gas pressures, temperatures, flow rates, and compositions throughout processing. Standard or customized gas pressure, temperature, and flow gauges may be employed. Gas composition may be monitored by withdrawing a gas sample and subjecting the gas sample to mass spectrometry, gas chromatography, or FTIR spectroscopy, for example. Gas composition may be measured, for example, according to ASTM D7833, D1945, D1946, or D3588, which test methods are incorporated by reference herein. Process adjustments may be made dynamically using measurements of gas pressures, temperatures, flow rates, and/or compositions, if deemed necessary or desirable, using well-known principles of process control (feedback, feedforward, proportional-integral-derivative logic, etc.).

As will also be appreciated by a skilled artisan, the processes and systems of the invention may utilize various process simulations, modeling, and engineering calculations, both in the initial design as well as during operation. Process calculations and simulations may be performed using process simulation software, such as Aspen Plus® (Aspen Technology Inc., Bedford, Massachusetts, USA).

The present invention may be applied to a wide range of throughputs and product generation capacities in a given process and system, such as from about 100 thousand gallons/year to about 100 million gallons/year of aviation fuel, for example.

In addition to aviation fuel as the primary product, there may be a number of co-products from the processes and systems of the invention. Co-products may include, but are not limited to, $CH_4$, $H_2$, CO, $CO_2$, $N_2$, $H_2O$, hydrocarbons, alcohols, olefins, aromatics, and electricity generated on-site, for example.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A process for producing aviation fuel from syngas, said process comprising:
   (a) providing a starting syngas stream comprising $H_2$ and CO;
   (b) purifying said syngas feed stream to generate a clean syngas stream;
   (c) optionally, adjusting said $H_2$/CO ratio of said starting syngas stream or said clean syngas stream;
   (d) feeding said clean syngas stream to an alcohol-synthesis reactor operated at effective alcohol-synthesis conditions and in the presence of an alcohol-synthesis catalyst, to catalytically convert at least a portion of said $H_2$ and said CO to a $C_1$-$C_{10}$ mixed-alcohol stream and a reactor off-gas;
   (e) optionally, purifying said $C_1$-$C_{10}$ mixed-alcohol stream to generate a clean $C_1$-$C_{10}$ mixed-alcohol stream;
   (f) feeding said $C_1$-$C_{10}$ mixed-alcohol stream or, if step (e) is conducted, said clean $C_1$-$C_{10}$ mixed-alcohol stream to a dehydration reactor operated at effective alcohol-dehydration conditions and in the presence of a dehydration catalyst, to catalytically convert at least a portion of said $C_1$-$C_{10}$ mixed alcohols to $C_2$-$C_{10}$ mixed olefins;
   (g) sequentially following step (f), feeding said $C_2$-$C_{10}$ mixed olefins to an oligomerization reactor operated at effective oligomerization conditions and in the presence of an oligomerization catalyst, to catalytically convert at least a portion of said $C_2$-$C_{10}$ mixed olefins to a hydrocarbon stream comprising $C_5$-$C_{16}$ mixed hydrocarbons;
   (h) optionally, separating and removing light or heavy hydrocarbons that are not within the $C_5$-$C_{16}$ range, from said hydrocarbon stream;
   (i) feeding said $C_5$-$C_{16}$ mixed hydrocarbons and hydrogen to a hydrogenation reactor operated at effective hydrogenation conditions and in the presence of a hydrogenation catalyst, to catalytically hydrogenate at least some C=C double bonds within said $C_5$-$C_{16}$ mixed hydrocarbons, thereby generating stabilized $C_5$-$C_{16}$ mixed hydrocarbons; and
   (j) recovering said stabilized $C_5$-$C_{16}$ mixed hydrocarbons as aviation fuel.

2. The process of claim 1, wherein starting syngas stream is obtained from a source selected from the group consisting of methane steam reforming, methane autothermal reforming, methane partial oxidation, biomass gasification, waste polymer gasification, municipal solid waste gasification or plasma treatment, coal gasification, coke gasification, $CO_2$ conversion to syngas, and combinations thereof.

3. The process of claim 1, wherein said clean $C_1$-$C_{10}$ mixed-alcohol stream is a $C_2$-$C_5$ mixed-alcohol stream.

4. The process of claim 1, wherein said clean $C_1$-$C_{10}$ mixed-alcohol stream has a number-average carbon number selected from 2 to 5.

5. The process of claim 1, wherein said clean $C_1$-$C_{10}$ mixed-alcohol stream has a number-average carbon number selected from 3 to 5.

6. The process of claim 1, wherein said clean $C_1$-$C_{10}$ mixed-alcohol stream has a number-average carbon number selected from 2 to 4.

7. The process of claim 1, wherein said clean $C_1$-$C_{10}$ mixed-alcohol stream has a number-average carbon number selected from 3 to 6.

8. The process of claim 1, wherein said clean $C_1$-$C_{10}$ mixed-alcohol stream has a number-average carbon number selected from 3 to 4.

9. The process of claim 1, wherein said clean $C_1$-$C_{10}$ mixed-alcohol stream has a number-average carbon number selected based on the influence of said number-average carbon number on downstream process performance in step (f), step (g), and/or step (i).

10. The process of claim 1, wherein said process further comprises a step of feeding a portion of said starting syngas stream and/or said clean syngas stream, as an aromatics-allocated syngas stream, to a syngas-to-aromatics reactor operated at effective aromatization conditions in the presence of an aromatization catalyst, to catalytically convert at least a portion of said aromatics-allocated syngas stream to a $C_6$-$C_{16}$ mixed aromatics stream.

11. The process of claim 10, wherein said $C_6$-$C_{16}$ mixed aromatics stream is combined with said stabilized $C_5$-$C_{16}$ mixed hydrocarbons to generate an aromatics-containing aviation fuel.

12. The process of claim 11, wherein said aromatics-containing aviation fuel contains from about 8 vol % to about 20 vol % total aromatics content.

13. The process of claim 1, wherein said process further comprises a step of feeding a portion of said $C_1$-$C_{10}$ mixed-alcohol stream and/or said clean $C_1$-$C_{10}$ mixed-alcohol stream, as an aromatics-allocated alcohol stream, to an alcohol-to-aromatics reactor operated at effective aromatization conditions in the presence of an aromatization catalyst, to catalytically convert at least a portion of said aromatics-allocated alcohol stream to a $C_6$-$C_{16}$ mixed aromatics stream.

14. The process of claim 13, wherein said $C_6$-$C_{16}$ mixed aromatics stream is combined with said stabilized $C_5$-$C_{16}$ mixed hydrocarbons to generate an aromatics-containing aviation fuel.

15. The process of claim 14, wherein said aromatics-containing aviation fuel contains from about 8 vol % to about 20 vol % total aromatics content.

16. The process of claim 1, wherein said process further comprises isomerizing a portion of said $C_2$-$C_{10}$ mixed olefins to create branched $C_2$-$C_{10}$ olefins, sequentially following step (f) and before step (g).

17. The process of claim 1, wherein said process further comprises isomerizing a portion of said $C_5$-$C_{16}$ mixed hydrocarbons, before step (i) or during step (i), using a hydroisomerization catalyst, to create branched $C_5$-$C_{16}$ hydrocarbons.

18. The process of claim 1, wherein said clean syngas stream has a reactor-feed $H_2$/CO ratio selected from about 0.7 to about 1.6.

19. The process of claim 18, wherein said reactor-feed $H_2$/CO ratio is selected from about 0.8 to about 1.2.

20. The process of claim 1, wherein said starting syngas stream contains excess $H_2$ relative to a selected reactor-feed $H_2$/CO ratio, and wherein said excess $H_2$ is separated from said starting syngas stream or from said clean syngas stream.

21. The process of claim 20, wherein said excess $H_2$ is utilized as at least some of said hydrogen in step (i) as feed to said hydrogenation reactor.

22. The process of claim 1, wherein said process further comprises removal of at least some methanol in an output stream from said alcohol-synthesis reactor, as removed methanol.

23. The process of claim 22, wherein said process further comprises recycle of at least some of said removed methanol.

24. The process of claim 22, wherein said process further comprises recycle of substantially all of said removed methanol.

25. The process of claim 1, wherein in step (d), said alcohol-synthesis catalyst is a potassium-promote, vanadium-containing, sulfided cobalt-molybdenum catalyst.

26. The process of claim 1, wherein step (e) includes one or more of sulfur removal, water removal, and distillation.

27. The process of claim 1, wherein said reactor off-gas is recycled to step (b).

28. The process of claim 1, wherein step (h) is conducted, and wherein step (h) utilizes distillation.

29. The process of claim 1, wherein said process uses heat evolved from at least one of step (d), step (g), or step (i), in at least one of step (f) or step (h).

30. The process of claim 1, wherein said aviation fuel qualifies as sustainable aviation fuel under ASTM D7566-24a.

* * * * *